(12) United States Patent
Xu et al.

(10) Patent No.: US 12,610,303 B2
(45) Date of Patent: Apr. 21, 2026

(54) METHODS, APPARATUSES, AND COMPUTER READABLE MEDIA FOR CONTROLLING DOWNLINK TRANSMISSIONS IN INTEGRATED ACCESS AND BACKHAUL NETWORK

(71) Applicant: Nokia Solutions and Networks Oy, Espoo (FI)

(72) Inventors: Xiang Xu, Beijing (CN); Ilkka Keskitalo, Oulu (FI); Henri Koskinen, Espoo (FI); Matti Laitila, Oulu (FI); Esa Malkamäki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 375 days.

(21) Appl. No.: 18/248,720

(22) PCT Filed: Nov. 11, 2020

(86) PCT No.: PCT/CN2020/128120
§ 371 (c)(1),
(2) Date: Apr. 12, 2023

(87) PCT Pub. No.: WO2022/099509
PCT Pub. Date: May 19, 2022

(65) Prior Publication Data
US 2023/0379793 A1      Nov. 23, 2023

(51) Int. Cl.
*H04W 40/24* (2009.01)
*H04W 48/16* (2009.01)
(Continued)

(52) U.S. Cl.
CPC .......... *H04W 40/24* (2013.01); *H04W 48/16* (2013.01); *H04W 72/21* (2023.01); *H04W 88/085* (2013.01)

(58) Field of Classification Search
CPC ... H04W 36/12; H04W 36/30; H04W 36/302; H04W 36/32; H04W 36/322;
(Continued)

(56) References Cited

U.S. PATENT DOCUMENTS

| | | | | |
|---|---|---|---|---|
| 11,963,252 B2 * | 4/2024 | Kim | ...................... | H04W 76/19 |
| 12,010,739 B2 * | 6/2024 | Akl | ...................... | H04W 76/10 |

(Continued)

FOREIGN PATENT DOCUMENTS

| | | |
|---|---|---|
| CN | 109803453 A | 5/2019 |
| CN | 110636548 A | 12/2019 |

(Continued)

OTHER PUBLICATIONS

Office Action received for corresponding Chinese Patent Application No. 202080107092.7, dated Aug. 17, 2024, 7 pages of Office Action and no page of translation available.

(Continued)

*Primary Examiner* — Brian T O Connor
(74) *Attorney, Agent, or Firm* — Barta Jones, PLLC

(57) ABSTRACT

Disclosed are methods for controlling downlink transmissions in an integrated access and backhaul network. An example method may include determining to control a first downlink transmission for a first interface between a second apparatus associated with a user plane of the central unit of the donor and a node in the integrated access and backhaul network, and transmitting, to the second apparatus, a first non UE-associated signaling request to control the first downlink transmission for the first interface, the first non UE-associated signaling request including information associated with the node. Related apparatuses and computer readable media are also disclosed.

12 Claims, 7 Drawing Sheets

(51) Int. Cl.
    *H04W 72/21*          (2023.01)
    *H04W 88/08*          (2009.01)

(58) Field of Classification Search
    CPC ..... H04W 40/24; H04W 48/16; H04W 72/21;
                 H04W 88/085; H04W 76/12; H04W
                                              92/12
    See application file for complete search history.

(56)                     References Cited

U.S. PATENT DOCUMENTS

| | | | | |
|---|---|---|---|---|
| 12,193,094 | B2 * | 1/2025 | Jung | H04W 24/04 |
| 12,219,458 | B2 * | 2/2025 | Zhu | H04L 9/40 |
| 12,382,533 | B2 * | 8/2025 | Zhu | H04W 76/22 |
| 2019/0313244 | A1 | 10/2019 | Wang et al. | |
| 2020/0106663 | A1 | 4/2020 | Yoo | |
| 2020/0113008 | A1 * | 4/2020 | Luo | H04W 72/04 |
| 2020/0351749 | A1 | 11/2020 | Tesanovic | |
| 2020/0351854 | A1 | 11/2020 | Wang et al. | |
| 2021/0211939 | A1 * | 7/2021 | Teyeb | H04W 40/12 |
| 2021/0258244 | A1 | 8/2021 | Xu et al. | |
| 2021/0378035 | A1 * | 12/2021 | Zhu | H04W 36/0019 |
| 2023/0156848 | A1 * | 5/2023 | Zhu | H04W 74/0841 |
| | | | | 370/329 |
| 2023/0209390 | A1 * | 6/2023 | Zeng | H04W 24/02 |
| 2024/0163709 | A1 * | 5/2024 | Mildh | H04W 76/12 |

FOREIGN PATENT DOCUMENTS

| | | | |
|---|---|---|---|
| CN | 111585725 | A | 8/2020 |
| CN | 111586749 | A | 8/2020 |
| CN | 111918331 | A | 11/2020 |
| EP | 3716681 | A1 | 9/2020 |
| WO | 2019/245442 | A1 | 12/2019 |
| WO | 2020/017941 | A1 | 1/2020 |
| WO | 2020/031004 | A1 | 2/2020 |

OTHER PUBLICATIONS

Extended European Search Report received for corresponding European Patent Application No. 20961068.2, dated Oct. 20, 2023, 14 pages.
Office Action received for corresponding Chinese Patent Application No. 202080107092.7, dated Mar. 8, 2024, 10 pages of Office Action and no page of translation available.
"Summary of DL End-to-end flow control in IAB network", 3GPP TSG-RAN WG3 Meeting #106, R3-197129, Agenda item: 13.2.2 (User plane), Samsung, Nov. 18-22, 2019, 5 pages.
"3rd Generation Partnership Project; Technical Specification Group Radio Access Network; NG-RAN Architecture description (Release 16)", 3GPP TS 38.401, V16.3.0, Sep. 2020, pp. 1-78.
"3rd Generation Partnership Project; Technical Specification Group Radio Access Network; NG-RAN; F1 application protocol (F1AP) (Release 16)", 3GPP TS 38.473, V16.3.0, Sep. 2020, pp. 1-455.
"Summary of Offline Discussion on Inter-donor Migration", 3GPP TSG-RAN WG3 Meeting #109-e, R3-205466, Agenda: 13.2.1, Ericsson, Aug. 17-27, 2020, 17 pages.
"3rd Generation Partnership Project; Technical Specification Group Radio Access Network; NG-RAN; E1 Application Protocol (E1AP) (Release 16)", 3GPP TS 38.463, V16.3.0, Sep. 2020, pp. 1-235.
"BL CR to 38.401 Support for IAB", 3GPP TSG RAN WG3 Meeting #108-e, R3-204462, Huawei, Jun. 1-11, 2020, 25 pages.
"IAB-node migration between different IAB-donors", 3GPP TSG-RAN WG3 #103, R3-190418, Agenda: 13.3.2.3, LG Electronics Inc, Feb. 25-Mar. 1, 2019, 5 pages.
International Search Report and Written Opinion received for corresponding Patent Cooperation Treaty Application No. PCT/CN2020/128120, dated Jul. 26, 2021, 10 pages.
"E2E flow control for IAB network", 3GPP TSG-RAN WG3 Meeting #105bis, R3-195457, Agenda: 13.2.2, Huawei, Oct. 14-18, 2019, pp. 1-4.
"Discussion on Enhancement to DL end-to-end flow control control in IAB", 3GPP TSG-RAN WG3 Meeting#106, R3-196687, Agenda: 13.2.2.1, ZTE, Nov. 18-22, 2019, 15 pages.

* cited by examiner

301 — CU-CP

302 — CU-UP

Determining to control DL transmissions for at least one F1-U interface associated with an IAB node       303

304
Request including information associated with the IAB node

305       Controlling the DL transmissions for at least one F1-U interface associated with the IAB node indicated in the request

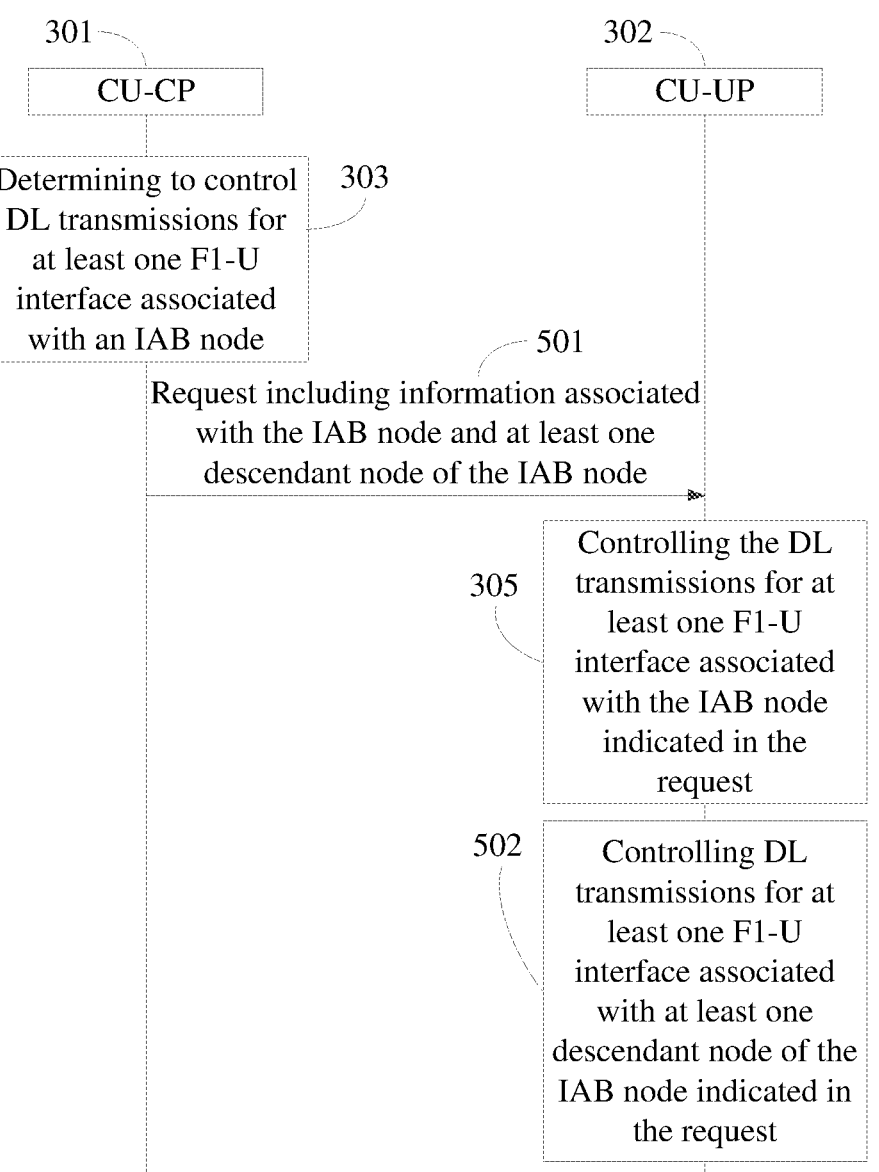

301 — CU-CP

302 — CU-UP

303
Determining to control DL transmissions for at least one F1-U interface associated with an IAB node 501
Request including information associated with the IAB node and at least one descendant node of the IAB node 305
Controlling the DL transmissions for at least one F1-U interface associated with the IAB node indicated in the request 502
Controlling DL transmissions for at least one F1-U interface associated with at least one descendant node of the IAB node indicated in the request

Figures 7, 8, 9:
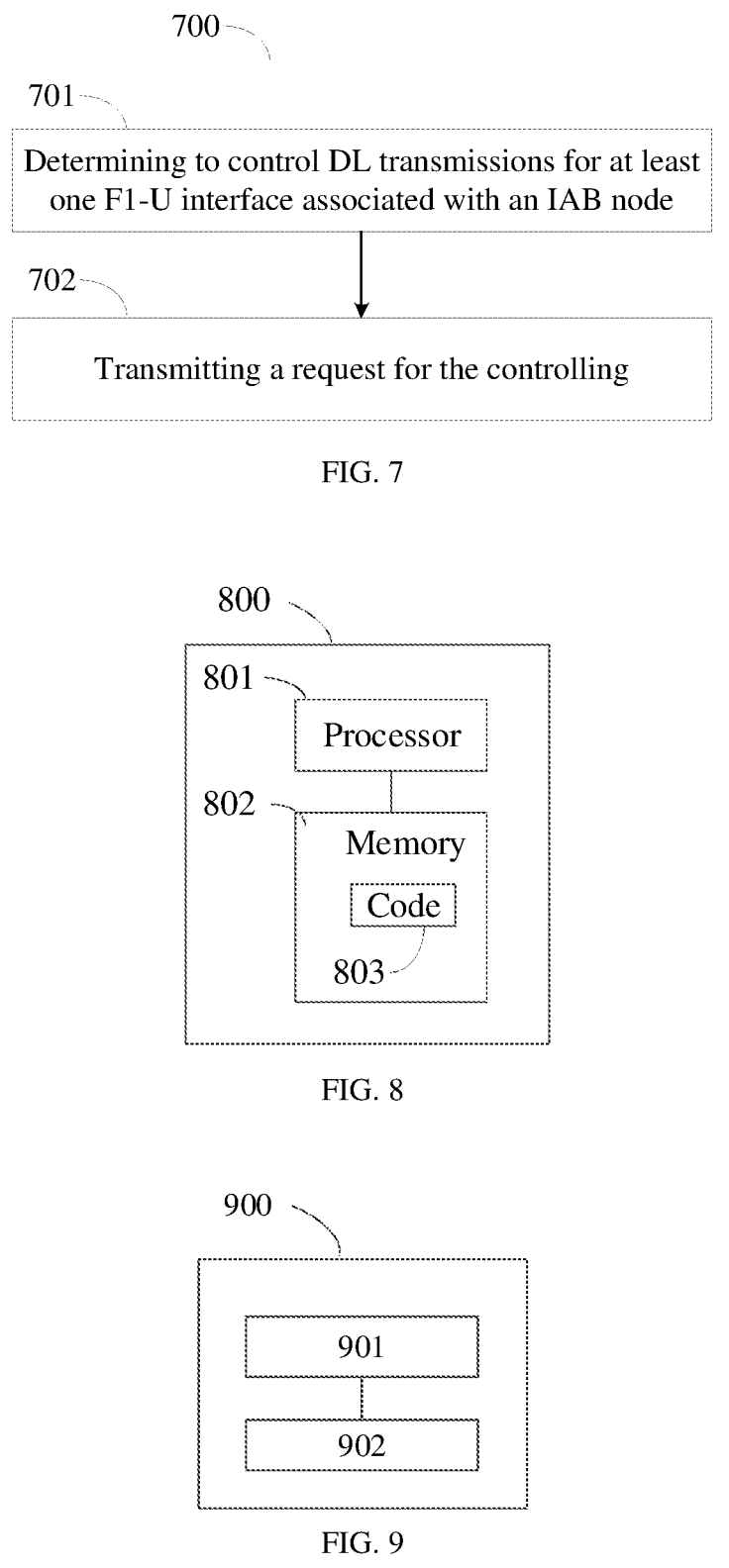

Determining to control DL transmissions for at least one F1-U interface associated with an IAB node

702

Transmitting a request for the controlling

Processor

802

Memory

Code

1000
1001
Receiving a request to control DL transmissions for at least one F1-U interface associated with an IAB node
1002
Controlling the DL transmissions based on the request
FIG. 10
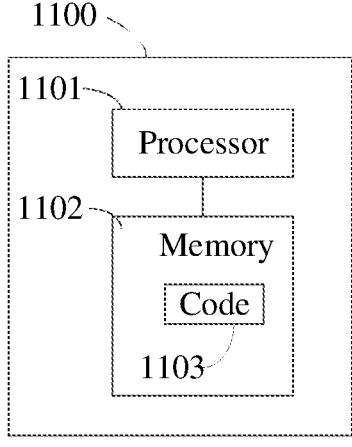
1100
1101
Processor
1102
Memory
Code
1103
FIG. 11
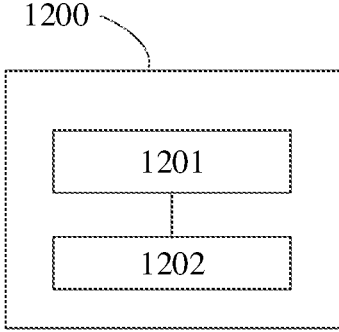
1200
1201
1202
FIG. 12

METHODS, APPARATUSES, AND COMPUTER READABLE MEDIA FOR CONTROLLING DOWNLINK TRANSMISSIONS IN INTEGRATED ACCESS AND BACKHAUL NETWORK

RELATED APPLICATION

This application claims priority to PCT Application No. PCT/CN2020/128120, filed on Nov. 11, 2020, which is incorporated herein by reference in its entirety

TECHNICAL FIELD

Various embodiments relate to methods, apparatuses, and computer readable media for controlling downlink transmissions in an integrated access and backhaul network.

BACKGROUND

Integrated access and backhaul (IAB) network, where a part of radio resources is also used for wireless backhauling, has been introduced in a telecommunication system such as a new radio (NR or 5G) system, so that, for example, flexible and dense deployments of NR cells may be enabled without densifying the transport network proportionately and the site acquisition costs and fiber deployment costs may be reduced.

SUMMARY

In a first aspect, disclosed is an apparatus including at least one processor and at least one memory, where the at least one memory may include computer program code, and where the at least one memory and the computer program code may be configured to, with the at least one processor, cause the apparatus as a first apparatus associated with a control plane of a central unit of a donor in an integrated access and backhaul network to perform: determining to control a first downlink transmission for a first interface between a second apparatus associated with a user plane of the central unit of the donor and a node in the integrated access and backhaul network; and transmitting, to the second apparatus, a first non UE-associated signaling request to control the first downlink transmission for the first interface, the first non UE-associated signaling request comprising information associated with the node.

In some embodiments, the first non UE-associated signaling request may include: a request to start the first downlink transmission for the first interface; or a request to stop the first downlink transmission for the first interface.

In some embodiments, the first non UE-associated signaling request may include at least one of: an identity of a distributed unit of the node; an address of the node; an identifier of a cell associated with the node; a routing identifier of a routing path associated the node; and a quality of service parameter value for traffic associated with the node.

In some embodiments, the first non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node, and a quality of service parameter value for traffic associated with the descendant node.

In some embodiments, the at least one memory and the computer program code may be configured to, with the at least one processor, cause the apparatus to further perform: transmitting, to the second apparatus, a second non UE-associated signaling request to start a second downlink transmission for a second interface between the second apparatus and a descendant node of the node in the integrated access and backhaul network, or to stop the second downlink transmission for the second interface, the second non UE-associated signaling request comprising information associated with the descendant node.

In some embodiments, the second non UE-associated signaling request may include at least one of: an identity of a distributed unit of the descendant node; an address of the descendant node; an identifier of a cell associated with the descendant node; a routing identifier of a routing path associated the descendant node; and a quality of service parameter value for traffic associated with the descendant node.

In a second aspect, disclosed is a method including: determining, at a first apparatus associated with a control plane of a central unit of a donor in an integrated access and backhaul network, to control a first downlink transmission for a first interface between a second apparatus associated with a user plane of the central unit of the donor and a node in the integrated access and backhaul network; and transmitting, to the second apparatus, a first non UE-associated signaling request to control the first downlink transmission for the first interface, the first non UE-associated signaling request comprising information associated with the node.

In some embodiments, the first non UE-associated signaling request may include: a request to start the first downlink transmission for the first interface; or a request to stop the first downlink transmission for the first interface.

In some embodiments, the first non UE-associated signaling request may include at least one of: an identity of a distributed unit of the node; an address of the node; an identifier of a cell associated with the node; a routing identifier of a routing path associated the node; and a quality of service parameter value for traffic associated with the node.

In some embodiments, the first non UE-associated signaling request may further include at least one of: an identity of a distributed unit of a descendant node of the node in the integrated access and backhaul network; an address of the descendant node; an identifier of a cell associated with the descendant node; a routing identifier of a routing path associated the descendant node; and a quality of service parameter value for traffic associated with the descendant node.

In some embodiments, the method may further include: transmitting, to the second apparatus, a second non UE-associated signaling request to start a second downlink transmission for a second interface between the second apparatus and a descendant node of the node in the integrated access and backhaul network, or to stop the second downlink transmission for the second interface, the second non UE-associated signaling request comprising information associated with the descendant node.

In some embodiments, the second non UE-associated signaling request may include at least one of: an identity of a distributed unit of the descendant node; an address of the descendant node; an identifier of a cell associated with the descendant node; a routing identifier of a routing path associated with the descendant node; and a quality of service parameter value for traffic associated with the descendant node.

In a third aspect, disclosed is an apparatus as a first apparatus associated with a control plane of a central unit of a donor in an integrated access and backhaul network. The apparatus may include: means for determining to control a first downlink transmission for a first interface between a second apparatus associated with a user plane of the central unit of the donor and a node in the integrated access and backhaul network; and means for transmitting, to the second apparatus, a first non UE-associated signaling request to control the first downlink transmission for the first interface, the first non UE-associated signaling request comprising information associated with the node.

In some embodiments, the first non UE-associated signaling request may include: a request to start the first downlink transmission for the first interface; or a request to stop the first downlink transmission for the first interface.

In some embodiments, the first non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the first non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

In some embodiments, the apparatus may further include: means for transmitting, to the second apparatus, a second non UE-associated signaling request to start a second downlink transmission for a second interface between the second apparatus and a descendant node of the node in the integrated access and backhaul network, or to stop the second downlink transmission for the second interface, the second non UE-associated signaling request comprising information associated with the descendant node.

In some embodiments, the second non UE-associated signaling request may include at least one of: an identity of a distributed unit of the descendant node; an address of the descendant node; an identifier of a cell associated with the descendant node; a routing identifier of a routing path associated with the descendant node; and a quality of service parameter value for traffic associated with the descendant node.

In a fourth aspect, a computer readable medium is disclosed. The computer readable medium may include instructions stored thereon for causing a first apparatus associated with a control plane of a central unit of a donor in an integrated access and backhaul network to perform: determining to control a first downlink transmission for a first interface between a second apparatus associated with a user plane of the central unit of the donor and a node in the integrated access and backhaul network; and transmitting, to the second apparatus, a first non UE-associated signaling request to control the first downlink transmission for the first interface, the first non UE-associated signaling request comprising information associated with the node.

In some embodiments, the first non UE-associated signaling request may include: a request to start the first downlink transmission for the first interface; or a request to stop the first downlink transmission for the first interface.

In some embodiments, the first non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the first non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

In some embodiments, the instructions may cause the first apparatus to further perform: transmitting, to the second apparatus, a second non UE-associated signaling request to start a second downlink transmission for a second interface between the second apparatus and a descendant node of the node in the integrated access and backhaul network, or to stop the second downlink transmission for the second interface, the second non UE-associated signaling request comprising information associated with the descendant node.

In some embodiments, the second non UE-associated signaling request may include at least one of: an identity of a distributed unit of the descendant node; an address of the descendant node; an identifier of a cell associated with the descendant node; a routing identifier of a routing path associated with the descendant node; and a quality of service parameter value for traffic associated with the descendant node.

In a fifth aspect, disclosed is an apparatus comprising at least one processor and at least one memory, where the at least one memory may include computer program code, and where the at least one memory and the computer program code may be configured to, with the at least one processor, cause the apparatus as a first apparatus associated with a user plane of a central unit of a donor in an integrated access and backhaul network to perform: receiving, from a second apparatus associated with a control plane of the central unit of the donor, a non UE-associated signaling request to control a first downlink transmission for a first interface between the first apparatus and a node in the integrated access and backhaul network, the non UE-associated signaling request comprising information associated with the node; and controlling the first downlink transmission for the first interface based on the non UE-associated signaling request.

In some embodiments, the controlling may include: stopping the first downlink transmission for the first interface in a case where the non UE-associated signaling request indicates to stop the first downlink transmission for the first interface; or starting the first downlink transmission for the first interface in a case where the non UE-associated signaling request indicates to start the first downlink transmission for the first interface.

In some embodiments, the at least one memory and the computer program code may be configured to, with the at least one processor, cause the apparatus to further perform: stopping a second downlink transmission for a second interface between the first apparatus and a descendant node of the node in the integrated access and backhaul network in a case where the non UE-associated signaling request indicates to stop the first downlink transmission for the first interface; or starting the second downlink transmission for the second interface in a case where the non UE-associated signaling request indicates to start the first downlink transmission for the first interface.

In some embodiments, the non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

In a sixth aspect, disclosed is a method including: receiving, at a first apparatus associated with a user plane of a central unit of a donor in an integrated access and backhaul network and from a second apparatus associated with a control plane of the central unit of the donor, a non UE-associated signaling request to control a first downlink transmission for a first interface between the first apparatus and a node in the integrated access and backhaul network, the non UE-associated signaling request comprising information associated with the node; and controlling the first downlink transmission for the first interface based on the non UE-associated signaling request.

In some embodiments, the controlling may include: stopping the first downlink transmission for the first interface in a case where the non UE-associated signaling request indicates to stop the first downlink transmission for the first interface; or starting the first downlink transmission for the first interface in a case where the non UE-associated signaling request indicates to start the first downlink transmission for the first interface.

In some embodiments, the method may further include: stopping a second downlink transmission for a second interface between the first apparatus and a descendant node of the node in the integrated access and backhaul network in a case where the non UE-associated signaling request indicates to stop the first downlink transmission for the first interface; or starting the second downlink transmission for the second interface in a case where the non UE-associated signaling request indicates to start the first downlink transmission for the first interface.

In some embodiments, the non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

In a seventh aspect, disclosed is an apparatus as a first apparatus associated with a user plane of a central unit of a donor in an integrated access and backhaul network. The apparatus may include: means for receiving, from a second apparatus associated with a control plane of the central unit of the donor, a non UE-associated signaling request to control a first downlink transmission for a first interface between the first apparatus and a node in the integrated access and backhaul network, the non UE-associated signaling request comprising information associated with the node; and means for controlling the first downlink transmission for the first interface based on the non UE-associated signaling request.

In some embodiments, the controlling may include: stopping the first downlink transmission for the first interface in a case where the non UE-associated signaling request indicates to stop the first downlink transmission for the first interface; or starting the first downlink transmission for the first interface in a case where the non UE-associated signaling request indicates to start the first downlink transmission for the first interface.

In some embodiments, the apparatus may further include: means for stopping a second downlink transmission for a second interface between the first apparatus and a descendant node of the node in the integrated access and backhaul network in a case where the non UE-associated signaling request indicates to stop the first downlink transmission for the first interface; or starting the second downlink transmission for the second interface in a case where the non UE-associated signaling request indicates to start the first downlink transmission for the first interface.

In some embodiments, the non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

In an eighth aspect, a computer readable medium is disclosed. The computer readable medium may include instructions stored thereon for causing a first apparatus associated with a user plane of a central unit of a donor in an integrated access and backhaul network to perform: receiving, from a second apparatus associated with a control plane of the central unit of the donor, a non UE-associated signaling request to control a first downlink transmission for a first interface between the first apparatus and a node in the integrated access and backhaul network, the non UE-associated signaling request comprising information associated with the node; and controlling the first downlink transmission for the first interface based on the non UE-associated signaling request.

In some embodiments, the controlling may include: stopping the first downlink transmission for the first interface in a case where the non UE-associated signaling request indicates to stop the first downlink transmission for the first interface; or starting the first downlink transmission for the first interface in a case where the non UE-associated signaling request indicates to start the first downlink transmission for the first interface.

In some embodiments, the instructions may cause the first apparatus to further perform: stopping a second downlink transmission for a second interface between the first apparatus and a descendant node of the node in the integrated access and backhaul network in a case where the non UE-associated signaling request indicates to stop the first downlink transmission for the first interface; or starting the second downlink transmission for the second interface in a case where the non UE-associated signaling request indicates to start the first downlink transmission for the first interface.

In some embodiments, the non UE-associated signaling request may include at least one of: an identity of a distributed unit of the node; an address of the node; an identifier of a cell associated with the node; a routing identifier of a routing path associated with the node; and a quality of service parameter value for traffic associated with the node.

In some embodiments, the non UE-associated signaling request may further include at least one of: an identity of a distributed unit of a descendant node of the node in the integrated access and backhaul network; an address of the descendant node; an identifier of a cell associated with the descendant node; a routing identifier of a routing path associated with the descendant node; and a quality of service parameter value for traffic associated with the descendant node.

BRIEF DESCRIPTION OF THE DRAWINGS

Some embodiments will now be described, by way of non-limiting examples, with reference to the accompanying drawings.

FIG. 5 illustrates an example of operations for controlling the downlink transmissions in an IAB network in an embodiment.

FIG. 7 illustrates an example method for controlling downlink transmissions in an IAB network in an embodiment.

FIG. 8 illustrates an example apparatus for controlling downlink transmissions in an IAB network in an embodiment.

FIG. 9 illustrates another example apparatus for controlling downlink transmissions in an IAB network in an embodiment.

FIG. 10 illustrates another example method for controlling downlink transmissions in an IAB network in an embodiment.

FIG. 11 illustrates another example apparatus for controlling downlink transmissions in an IAB network in an embodiment.

FIG. 12 illustrates another example apparatus for controlling downlink transmissions in an IAB network in an embodiment.

DETAILED DESCRIPTION

Figures 1, 2:
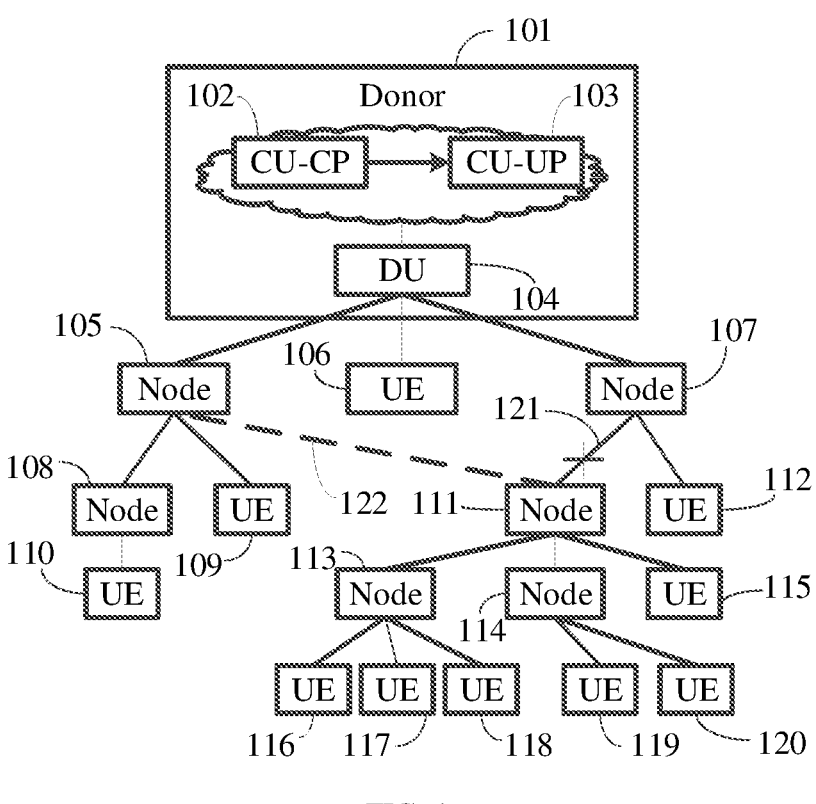
FIG. 1 illustrates an example of downlink transmission control in an IAB network in an embodiment.
FIG. 2 illustrates another example of downlink transmission control in an IAB network in an embodiment.

In the NR system, a base station (BS) may include a central unit (CU) and at least one distributed unit (DU), where the CU may host radio resource control (RRC), service data adaptation protocol (SDAP) and packet data convergence protocol (PDCP), and may control the operations of the one or more DUs. Further, the CU may include NR user plane (UP) and control plane (CP) protocols to provide services for the terminal device or user equipment (UE). For example, the UP may provide functions related to handling UP data, such as packet routing and quality of service (QoS) handing, and the CP may provide functions such as security/authentication/authorization control, paging, and mobility management. The CP may be also referred as CU-CP herein. The UP may be also referred as CU-UP herein.

An IAB network may be configured with spanning tree (ST) and directed acyclic graph (DAG) topologies, where a donor BS (also referred to as a donor node in the IAB network or an IAB-donor, or simply referred to as a donor herein) hosting the CU functionality and one or more donor DUs, and one or more IAB nodes (or simply referred to as nodes herein) may be included. An IAB node may include a mobile termination (MT) function used to communicate with a parent node (e.g. another IAB node serving this IAB node or the IAB-donor) in the IAB network, and at least one DU (or IAB-DU) function used to communicate with the downstream IAB node (e.g. another IAB node served by this IAB node) in the IAB network or the UE served by this IAB node. The DU function of the IAB node is also referred as the distributed unit of the IAB node or distributed unit of the node herein. Backhaul (BH) radio link control (RLC) channels or connections may be used for transporting data packets between an IAB node and its parent IAB node or between an IAB node MT and the IAB-donor DU. In an IAB network, communications between the CU-UP and a DU in the IAB donor or an IAB node may be performed via an F1 user plane (F1-U) interface between the CU-UP and the DU in the IAB donor or an IAB node. For example, a tunnel may be established for the communications via the F1 user plane (F1-U) interface between the CU-UP and the DU in the IAB donor or an IAB node based on a general packet radio system (GPRS) tunneling protocol (GTP). For example, the DL transmission between the CU-UP and the DU in the IAB donor or an IAB node may include DL F1-U traffics related to one or more (for example, all) descendant IAB nodes (for example, including one or more of: child IAB nodes directly connected to this IAB node; and other IAB nodes such as grandchild IAB nodes which are connected to this IAB node indirectly) or UEs served by the DU in the IAB donor or this IAB node.

For example, due to possible failures on BH connections in the IAB network, an IAB node may change its serving parent node, which may trigger a topology adaptation of the IAB network. For example, an IAB node may disconnect from its serving parent node (e.g. another IAB node, or a DU of the IAB donor) in a case where the MT part of the IAB node detaches from its serving cell, and may reconnect to its original serving parent node, or connect to another parent node under the same IAB donor in the IAB network (for example in a case of an intra-donor topology adaptation) or another parent node under a different IAB donor in the IAB network (for example in a case of an inter-donor topology adaptation).

The CU-CP of the IAB-donor, which may have an overview of the whole network topology/path, may be employed for the topology change or adaptation. However, the CU-UP of the IAB-donor may be unaware of for example the disconnection of an IAB node, and thus may continue to transmit DL data for the F1-U interface between the CU-UP and the DU of this IAB node, which may result in for example, packet loss and resource waste.

In one or more embodiments of this disclosure, the CU-CP of the IAB-donor in an IAB network may be configured to determine an IAB node, which for example is to disconnect from or connect (or reconnect) to a parent node in the IAB network, and for which DL transmission(s) for at least one F1-U interface between the CU-UP and the DU of the determined IAB node (for example, all F1-U interfaces associated with the determined IAB node, or all GTP tunnels for a F1-U interface between the CU-UP and the DU of the determined IAB node, or some GTP tunnels for a F1-U interface between the CU-UP and the DU of the determined IAB node) is to be controlled (for example, to be stopped in a case of disconnection, or to be started in a case of connection or reconnection). Then, the CU-CP may transmit, to the CU-UP, a request to control (for example, to stop or start) the DL transmission(s) for the at least one F1-U interface (for example, all F1-U interfaces, or all GTP tunnels of a F1-U interface, or some GTP tunnels of a F1-U interface) associated with the determined IAB node, which may include information associated with the determined IAB node. For example, the request may use non UE-associated signaling to control the DL transmission for F1-U GTP tunnels of multiple connected UEs, for example, a non UE-associated E1 Application Protocol (E1AP) signaling when the interface between the CU-CP and the CU-UP is an E1 interface. Thus, the request may also be referred as non UE-associated signaling request herein. Similarly, the start request may be also referred as non UE-associated signaling start request herein, and the stop request may be also referred as non UE-associated signaling stop request herein. Based on the request received from the CU-CP, the CU-UP may be configured to control (for example, to stop or start) the DL transmission(s) for the at least one F1-U interface (for example, all F1-U interfaces, or all GTP tunnels of a F1-U interface, or some GTP tunnels of a F1-U interface) associated with the determined IAB node. Thus, for example, a batch control for DL transmission(s) for the apparatuses (including UE(s) and descendant IAB node(s)) served by the determined IAB node may be allowed with a reduced signaling load, through which for example potential packet loss and resource waste may be avoided or mitigated.

FIG. 1 illustrates an example of DL transmission control in an IAB network in an embodiment. In the example as illustrated in FIG. 1, the IAB network may include a donor 101, and nodes 105, 107, 108, 111, 113, 114, and so on. At least one DU 104 of the donor 101 may be controlled by the CU of the donor 101 including the CU-CP 102 and the CU-UP 103, and serves the node 105, the node 107, and a UE 106. The node 105 serves a UE 109 and the node 108 which further serves a UE 110. The node 107 serves the node 111 and a UE 112. The node 111 further serves the node 113, the node 114, and a UE 115. The node 113 further serves a UE 116, a UE 117, and a UE 118. The node 114 further serves a UE 119 and a UE 120.

As illustrated in FIG. 1, a connection 121 between node 107 and the node 111 is disconnected for example in a case where a failure is suffered on the connection 121 or the MT part of the node 111 detaches from a cell associated with the node 107. Then, the CU-CP 102 may transmit, to the CU-UP 103, a request to stop the DL transmission(s) for F1-U interface(s) (for example all F1-U interfaces, or all GTP tunnels of a F1-U interface, or some GTP tunnels for a F1-U interface) between the CU-UP 103 and the DU of the node 111, which may for example include a DL F1-U traffic related to the node 113, a DL F1-U traffic related to the node 114, and a DL F1-U traffic related to terminal devices served by the node 111, such as the UE 115, as well as DL F1-U traffic related to terminal devices served by the nodes 113 and 114. Such stop request from the CU-CP 102 to the CU-UP 103 may include information associated with the node 111, for example including, but not limited to, one or more of: an identity (ID) of the DU of the node 111; an address of the node 111, for example, an internet protocol address of the IAB-DU in the node 111, or a backhaul adaptation protocol (BAP) address of the node 111, etc.; an ID of a cell associated with the node 111; a routing identifier (ID) of a routing path associated with the node 111; a quality of service parameter for F1-U traffic associated with node 111; or any other identifier that can identify a plurality of F1-U traffic associated with the node 111. For example, in a case where there are a plurality of DUs in the node 111, the stop request may also include a list of IDs of the DUs of the node 111. In another example, in a case where there are a plurality of addresses allocated for the node 111, the stop request may also include a list of the allocated addresses of the node 111. In yet another example, in a case where there are a plurality of cells associated with the node 111, the stop request may also include a list of the IDs of the cells associated with the node 111. In yet another example, in a case where there is a plurality of routing path(s) to the node 111, the stop request may also include a list of routing IDs associated with the node 111. For example, when the node 111 has a dual connection with two parent nodes, and the connection with one parent node has problem (e.g. a radio link failure), the stop request may indicate the list of routing IDs for the routing paths using that parent node. In yet another example, in a case where there is a plurality of F1-U traffic with different quality of service requirements to the node 111, the stop request may also include a list of quality of service parameters for the affected F1-U interface(s) associated with the node 111. For example, the CU-CP 102 may request CU-UP 103 to stop all traffics related to a specific quality of service parameters, e.g. when the IAB node 111 cannot fulfil that specific quality of service requirement.

In response to receiving the stop request from the CU-CP 102, the CU-UP 103 may stop the DL transmission(s) for the F1-U interface(s) associated with the DU ID or IAB node address included in the stop request. For example, in a case where the stop request from the CU-CP 102 includes a cell ID, the CU-UP 103 may determine the F1-U interface(s) associated with the cell based on the cell ID in the stop request, and may stop the DL transmission(s) for the F1-U interface(s) associated with the cell as indicated in the stop request. Thus, for example, the DL transmissions for the F1-U interfaces (or GTP tunnels) between the CU-UP 103 and the DU of the node 111 (including the DL F1-U traffic related to the node 113, the DL F1-U traffic related to the node 114, and the DL F1-U traffic related to the UE 115) may be stopped together by the CU-UP 103 in response to the stop request associated with the node 111 from the CU-CP 102.

For example, in a case where the CU-UP 103 does not know information associated with the descendant IAB nodes (including the child IAB nodes 113 and 114) of the node 111, the CU-CP 102 may further transmit, to the CU-UP 103, another request to stop the DL transmission(s) for the F1-U interface(s) (for example all F1-U interfaces associated with an IAB node, or all GTP tunnels for a F1-U interface associated with an IAB node, or some GTP tunnels for a F1-U interface associated with an IAB node, or some GTP-U tunnels) between the CU-UP 103 and the node 113, and yet another request to stop the DL transmission(s) for the F1-U interface(s) (for example all F1-U interfaces, or all GTP tunnels of a F1-U interface, or some GTP tunnels of a F1-U interface) between the CU-UP 103 and the node 114. Similar to the above stop request associated with the node 111, the stop request associated with the node 113 may include information associated with the node 113, for example including at least one of an ID of a DU of the node 113, an address of the node 113, for example, an internet protocol address of the IAB-DU in the node 113, or a Backhaul Adaptation Protocol (BAP) address of the node 113, etc., an ID of a cell associated with the node 113, a routing identifier (ID) of a routing path associated with the node 113, a quality of service parameter value for traffic associated with the node 113, or any other identifier that can identify a plurality of F1-U traffic associated with the node 113, and the stop request associated with the node 114 may include information associated with the node 114, for example including at least one of: an ID of a DU of the node 114; an address of the node 114, for example, an internet protocol address of the IAB-DU in the node 114, or a Backhaul Adaptation Protocol (BAP) address of the node 114, etc.; an ID of a cell associated with the node 114; a routing identifier (ID) of a routing path associated with the node 114; or any other identifier that can identify a plurality of F1-U traffic associated with the node 114, such as a quality of service parameter value for traffic associated with the node 114. Similar to the above stop request associated with the node 111, the stop request associated with the node 113 may also include a list of IDs of the DUs of the node 113 and/or a list of addresses of the node 113 and/or a list of IDs of the cells associated with the node 113 and/or a list of routing IDs associated with node 113 and/or a list of quality of service parameters for F1-U traffic associated with node 113, and the stop request associated with the node 114 may also include a list of IDs of the DUs of the node 114 and/or a list of addresses of the node 114 and/or a list of IDs of the cells associated with the node 114 and/or a list of routing IDs associated with node 114 and/or a list of quality of service parameters for F1-U traffic associated with node 114. In another example, requests related to nodes 111, 113 and 114 described above can be combined into a single request containing IDs of multiple nodes.

In another example, in a case where the CU-UP 103 does not know information associated with the descendant IAB nodes (including the child IAB nodes 113 and 114) of the node 111, the CU-CP 102 may further transmit, to the CU-UP 103, another request to stop at least one of: the DL transmission(s) for the F1-U interface(s) (for example all F1-U interfaces associated with the node 113, or all GTP tunnels for a F1-U interface associated with the node 113, or some GTP tunnels for a F1-U interface associated with the node 113) between the CU-UP 103 and the node 113, and the DL transmission(s) for the F1-U interface(s) (for example all F1-U interfaces associated with the node 114, or all GTP tunnels for a F1-U interface associated with the node 114, or some GTP tunnels for a F1-U interface associated with the node 114) between the CU-UP 103 and the node 114. For example, such stop request associated with both the node 113 and the node 114 may include both information associated with the node 113 and both information associated with the node 114.

Then, in response to receiving respective stop requests from the CU-CP 102, the CU-UP 103 may perform substantially the same operations for respective stop requests, so as stop the DL transmission(s) for the F1-U interface(s) associated with the DU IDs or IAB node addresses included in the respective stop requests. For example, in a case where a stop request from the CU-CP 102 includes a cell ID, the CU-UP 103 may determine the F1-U interface(s) associated with a cell based on the cell ID included in the stop request, and may stop the DL transmission(s) for the F1-U interface(s) or GTP tunnel(s) associated with the cell as indicated in the stop request. Thus, for example, the DL transmissions for the F1-U interfaces (or GTP tunnels) between the CU-UP 103 and the DU of the node 111 (including the DL F1-U traffic related to the node 113, the DL F1-U traffic related to the node 114, and the DL F1-U traffic related to the UE 115) may be stopped together by the CU-UP 103 in response to the stop request associated with the node 111 from the CU-CP 102, the DL transmissions for the F1-U interfaces (or GTP tunnels) between the CU-UP 103 and the DU of the node 113 (including the DL F1-U traffic related to the UE 116, the DL F1-U traffic related to the UE 117, and the DL F1-U traffic related to the UE 118) may be stopped together by the CU-UP 103 in response to the stop request associated with the node 113, and the DL transmissions for the F1-U interfaces (or GTP tunnels) between the CU-UP 103 and the DU of the node 114 (including the DL F1-U traffic related to the UE 119 and the DL F1-U traffic related to the UE 120) may be stopped together by the CU-UP 103 in response to the stop request associated with the node 114.

In another example, in a case where the CU-UP 103 does not know information associated with the descendant IAB nodes (including the child IAB nodes 113 and 114) of the node 111, the stop request associated with the node 111 from the CU-CP 102 to the CU-UP 103 may further include information associated with the descendant IAB node(s) of the node 111, for example including, but not limited to, one or more of: an ID of the a DU of the node 113; an address of the node 113, for example, an internet protocol address of the IAB-DU in the node 113, or a Backhaul Adaptation Protocol (BAP) address of the node 113, etc.; an ID of a cell associated with the node 113; a routing identifier (ID) of a routing path associated with the node 113; a quality of service parameter for F1-U traffic associated with node 113; or any other identifier that can identify a plurality of F1-U traffic associated with the node 113; an ID of a DU of the node 114; an address of the node 114, for example, an internet protocol address of the IAB-DU in the node 114, or a Backhaul Adaptation Protocol (BAP) address of the node 114, etc.; an ID of a cell associated with the node 114; a routing identifier (ID) of a routing path associated with the node 114; a quality of service parameter for F1-U traffic associated with node 114; or any other identifier that can identify a plurality of F1-U traffic associated with the node 114. For example, in a case where one or both of the nodes 113 and 114 have more than one addresses, and/or have more than one DUs, and/or are associated with more than one cells, the stop request associated with the node 111 may also include one or more of: a list of IDs of the DUs of the node 113; a list of addresses of the node 113; a list of IDs of the cells associated with the node 113; a list if routing IDs associated with node 113; a list of quality of service parameter values for F1-U traffic associated with node 113; a list of IDs of the DUs of the node 114; a list of addresses of the node 114; a list of IDs of the cells associated with the node 114; a list of routing IDs associated with node 114; a list quality of service parameter values for F1-U traffic associated with node 114; and so on.

Then, in response to receiving the stop request from the CU-CP 102, the CU-UP 103 may stop the DL transmission(s) for the F1-U interface(s) associated with respective DU IDs or IAB node addresses included in the stop request associated with the node 111. For example, in a case where the stop request from the CU-CP 102 includes at least one cell ID, the CU-UP 103 may determine the F1-U interface(s) associated with at least one cell based on the at least one cell ID included in the stop request, and may stop the DL transmission(s) for the F1-U interface(s) or GTP tunnel(s) associated with the at least one cell as indicated in the stop request. Thus, for example, the DL transmissions for the F1-U interfaces (or GTP tunnels) between the CU-UP 103 and the DU of the node 111 (including the DL F1-U traffic related to the node 113, the DL F1-U traffic related to the node 114, and the DL F1-U traffic related to the UE 115), the DL transmissions for the F1-U interfaces (or GTP tunnels) between the CU-UP 103 and the DU of the node 113 (including the DL F1-U traffic related to the UE 116, the DL F1-U traffic related to the UE 117, and the DL F1-U traffic related to the UE 118), and the DL transmissions for the F1-U interfaces (or GTP tunnels) between the CU-UP 103 and the DU of the node 114 (including the DL F1-U traffic related to the UE 119 and the DL F1-U traffic related to for the UE 120) may be stopped together by the CU-UP 103 in response to the stop request associated with the node 111 from the CU-CP 102.

In another example, in a case where the CU-UP 103 knows information associated with the descendant IAB nodes (including the child IAB nodes 113 and 114) of the node 111, the CU-UP 103 may stop DL F1-U traffic related to both the node 111 and one or more (for example, all) descendant IAB nodes of the node 111 together in response to receiving the stop request associated with the node 111. For example, CU-UP 103 may stop all DL F1-U traffic for the terminal devices connected to the node 111 and descendant IAB nodes of the node 111.

For example, based on information associated with an IAB node included in the stop request from the CU-CP 102, the CU-UP 103 may determine that the stop request is associated with the node 111, and may know that the descendant IAB nodes of the node 111 include the node 113 and the node 114. Then, for example, the CU-UP 103 may stop together the DL transmissions for the F1-U interfaces between the CU-UP 103 and the node 111 (including the DL F1-U traffic related to the node 113, the DL F1-U traffic related to the node 114, and the DL F1-U traffic related to the UE 115), the DL transmissions for the F1-U interfaces between the CU-UP 103 and the DU of the node 113 (including the DL F1-U traffic related to the UE 116, the DL F1-U traffic related to the UE 117, and the DL F1-U traffic related to the UE 118), and the DL transmissions for the F1-U interfaces between the CU-UP 103 and the DU of the node 114 (including the DL F1-U traffic related to the UE 119 and the DL F1-U traffic related to the UE 120).

For the DL F1-U data of the stopped DL transmissions, for example, at least a part of the DL F1-U data for the DL transmissions for the F1-U interfaces between the CU-UP 103 and the node 111 and/or at least a part of the DL F1-U data for the DL transmissions for the F1-U interfaces between the CU-UP 103 and the descendant IAB nodes of the node 111 may be buffered by the CU-UP 103 for a later resumption of the DL transmissions for the F1-U interfaces between the CU-UP 103 and the node 111 and/or descendant IAB nodes of the node 111.

In addition, as illustrated in FIG. 1, a new connection 122 may be established between the node 111 and the node 105, so that the node 111 may be served by the node 105 in a new topology of the IAB network. Then, the CU-CP 102 may transmit, to the CU-UP 103, a request to start or resume the DL transmission(s) for the F1-U interfaces (or the GTP tunnels) between the CU-UP 103 and the node 111, for example including the DL F1-U traffic related to the node 113, the DL F1-U traffic related to the node 114, and the DL F1-U traffic related to the UE 115. Similar to the stop request from the CU-CP 102 to the CU-UP 103, such start request from the CU-CP 102 to the CU-UP 103 may also include information associated with the node 111. For example, such start request may include, but is not limited to, one or more of: an ID of a DU of the node 111; an address of the node 111, for example, an internet protocol address of the IAB-DU in the node 111, or a Backhaul Adaptation Protocol (BAP) address of the node 111, etc.; an ID of a cell associated with the node 111; a routing identifier (ID) of a routing path associated with the node 111; a quality of service parameter for F1-U traffic associated with node 111; or any other identifier that can identify a plurality of F1-U traffic associated with the node 111. In another example, such start request associated with the node 111 may include, but is not limited to, one or more of: a list of IDs of at least one DU of the node 111; a list of addresses of the node 111; a list of IDs of at least one cell associated with the node 111; a list of routing IDs associated with node 111; and a list of quality of service parameter values for F1-U traffic associated with node 111.

In response to receiving the start request from the CU-CP 102, the CU-UP 103 may start or resume the DL transmission(s) for the F1-U interface(s) associated with the at least one DU ID or IAB node address included in the start request. For example, in a case where the start request from the CU-CP 102 includes at least one cell ID, the CU-UP 103 may determine the F1-U interface(s) associated with at least one cell based on the at least one cell ID included in the start request, and may start or resume the DL transmission(s) for the F1-U interface(s) or GTP tunnel(s) associated with the at least one cell as indicated in the stop request. Thus, for example, the DL transmissions for the F1-U interfaces (or GTP tunnels) between the CU-UP 103 and the node 111 (including the DL F1-U traffic related to the node 113, the DL F1-U traffic related to the node 114, and the DL F1-U traffic related to the UE 115) may be started or resumed together by the CU-UP 103 in response to the start request associated with the node 111 from the CU-CP 102, via the new serving node 105 rather than the original serving node 107.

For example, the CU-UP 103 may resume the previously stopped DL transmission for the F1-U interfaces (or GTP tunnels) between the CU-UP 103 and the node 111 by using the previously buffered DL F1-U data in response to the received start request from the CU-CP 102, so that the DL transmissions for the F1-U interfaces or at the user plane associated with the node 111 may be continued.

For example, in a case where the CU-UP 103 does not know information associated with the descendant IAB nodes (including the child IAB nodes 113 and 114) of the node 111, the CU-CP 102 may further transmit, to the CU-UP 103, another request to start or resume the DL transmission(s) for the F1-U interface(s) (for example all F1-U interfaces associated with the node 113, or all GTP tunnels for a F1-U interface associated with the node 113, or some GTP tunnels for a F1-U interface associated with the node 113) between the CU-UP 103 and the node 113, and yet another request to start or resume the DL transmission(s) for the F1-U interface(s) (for example all F1-U interfaces associated with the node 114, or all GTP tunnels for a F1-U interface associated with the node 114, or some GTP tunnels for a F1-U interface associated with the node 114) between the CU-UP 103 and the node 114. For example, the start request associated with the node 113 may include information associated with the node 113, for example including one or more of an ID of a DU of the node 113, an address of the node 113, for example, an internet protocol address of the IAB-DU in the node 113, or a Backhaul Adaptation Protocol (BAP) address of the node 113, etc., an ID of a cell associated with the node 113; a routing identifier (ID) of a routing path associated with the node 113; a quality of service parameter for F1-U traffic associated with node 113; or any other identifier that can identify a plurality of F1-U traffic associated with the node 113, and the start request associated with the node 114 may include information associated with the node 114, for example including one or more of an ID of a DU of the node 114, an address of the node 114, for example, an internet protocol address of the IAB-DU in the node 114, or a Backhaul Adaptation Protocol (BAP) address of the node 114, etc., an ID of a cell associated with the node 114; a routing identifier (ID) of a routing path associated with the node 114; a quality of service parameter for F1-U traffic associated with node 114; or any other identifier that can identify a plurality of F1-U traffic associated with the node 114. For example, the start request associated with the node 113 may also include a list of IDs of the DUs of the node 113 and/or a list of addresses of the node 113 and/or a list of IDs of the cells associated with the node 113 and/or a list of routing IDs associated with node 113 and/or a list of quality of service parameters for F1-U traffic associated with node 113, and the start request associated with the node 114 may also include a list of IDs of the DUs of the node 114 and/or a list of addresses of the node 114 and/or a list of IDs of the cells associated with the node 114 and/or a list of routing IDs associated with node 114 and/or a list of quality of service parameters for F1-U traffic associated with node 114. In another example, requests related to nodes 111, 113 and 114 described above can be combined into a single request containing IDs of multiple nodes.

In another example, in a case where the CU-UP 103 does not know information associated with the descendant IAB nodes (including the child IAB nodes 113 and 114) of the node 111, the CU-CP 102 may further transmit, to the CU-UP 103, another request to start or resume at least one of: the DL transmission(s) for the F1-U interface(s) (for example all F1-U interfaces associated with the node 113, or all GTP tunnels for a F1-U interface associated with the node 113, or some GTP tunnels for a F1-U interface associated with the node 113) between the CU-UP 103 and the node 113, and the DL transmission(s) for the F1-U interface(s) (for example all F1-U interfaces associated with the node 114, or all GTP tunnels for a F1-U interface associated with the node 114, or some GTP tunnels for a F1-U interface associated with the node 114) between the CU-UP 103 and the node 114. For example, such start request associated with both the node 113 and the node 114 may include both information associated with the node 113 and both information associated with the node 114.

Then, in response to receiving respective start requests from the CU-CP 102, the CU-UP 103 may perform substantially the same operations for respective start requests, so as start or resume the DL transmission(s) for the F1-U interface(s) associated with the at least one DU ID or IAB node address included in the respective start request. For example, in a case where the start request from the CU-CP 102 includes at least one cell ID, the CU-UP 103 may determine the F1-U interface(s) associated with at least one cell based on the at least one cell ID included in the start request, and may start or resume the DL transmission(s) for the F1-U interface(s) or GTP tunnel(s) associated with the at least one cell as indicated in the start request. Thus, for example, the DL transmissions for the F1-U interfaces (or GTP tunnels) between the CU-UP 103 and the node 111 (including the DL F1-U traffic related to the node 113, the DL F1-U traffic related to the node 114, and the DL F1-U traffic related to the UE 115) may be started or resumed together by the CU-UP 103 in response to the start request associated with the node 111 from the CU-CP 102, the DL transmissions for the F1-U interfaces (or GTP tunnels) between the CU-UP 103 and the node 113 (including the DL F1-U traffic related to the UE 116, the DL F1-U traffic related to the UE 117, and the DL F1-U traffic related to the UE 118) may be started or resumed together by the CU-UP 103 in response to the start request associated with the node 113, and the DL transmissions for the F1-U interfaces (or GTP tunnels) between the CU-UP 103 and the node 114 (including the DL F1-U traffic related to the UE 119 and the DL F1-U traffic related to the UE 120) may be started or resume together by the CU-UP 103 in response to the start request associated with the node 114.

In another example, in a case where the CU-UP 103 does not know information associated with the descendant IAB nodes (including the child IAB nodes 113 and 114) of the node 111, the start request associated with the node 111 from the CU-CP 102 to the CU-UP 103 may further include information associated with the descendant IAB node(s) of the node 111, for example including, but not limited to, one or more of: an ID of a DU of the node 113; an address of the node 113, for example, an internet protocol address of the IAB-DU in the node 113, or a Backhaul Adaptation Protocol (BAP) address of the node 113, etc.; an ID of a cell associated with the node 113; a routing ID associated with node 113; a quality of service parameter for F1-U traffic associated with node 113; an ID of a DU of the node 114; an address of the node 114, for example, an internet protocol address of the IAB-DU in the node 114, or a Backhaul Adaptation Protocol (BAP) address of the node 114, etc.; an ID of a cell associated with the node 114; a routing ID associated with node 114; a quality of service parameter for F1-U traffic associated with node 114; and so on. For example, in a case where one or both of the nodes 113 and 114 have more than one addresses, and/or have more than one DUs, and/or are associated with more than one cells, and/or are associated with more than one routing path, the start request associated with the node 111 may also include one or more of: a list of IDs of the DUs of the node 113; a list of addresses of the node 113; a list of IDs of the cells associated with the node 113; a list of routing IDs associated with node 113; a list of quality of service parameters for F1-U traffic associated with node 113; a list of IDs of the DUs of the node 114; a list of addresses of the node 114; a list of IDs of the cells associated with the node 114; a list of routing IDs associated with node 114; a list of quality of service parameters for F1-U traffic associated with node 114; and so on.

Then, in response to receiving the start request from the CU-CP 102, the CU-UP 103 may start or resume the DL transmission(s) for the F1-U interface(s) associated with respective DU IDs or IAB node addresses included in the start request associated with the node 111. For example, in a case where the start request from the CU-CP 102 includes at least one cell ID, the CU-UP 103 may determine the F1-U interface(s) associated with at least one cell based on the at least one cell ID included in the start request, and may start or resume the DL transmission(s) for the F1-U interface(s)

or GTP tunnel(s) associated with the at least one cell as indicated in the start request. Thus, for example, the DL transmissions for the F1-U interfaces (or GTP tunnels) between the CU-UP 103 and the node 111 (including the DL F1-U traffic related to the node 113, the DL F1-U traffic related to the node 114, and the DL F1-U traffic related to the UE 115), the DL transmissions for the F1-U interfaces (or GTP tunnels) between the CU-UP 103 and the node 113 (including the DL F1-U traffic related to the UE 116, the DL F1-U traffic related to the UE 117, and the DL F1-U traffic related to the UE 118), and the DL transmissions for the F1-U interfaces (or GTP tunnels) between the CU-UP 103 and the node 114 (including the DL F1-U traffic related to the UE 119 and the DL F1-U traffic related to the UE 120) may be started or resumed together by the CU-UP 103 in response to the start request associated with the node 111 from the CU-CP 102.

In another example, in a case where the CU-UP 103 knows information associated with the descendant IAB nodes (including the child IAB nodes 113 and 114) of the node 111, the CU-UP 103 may start or resume DL F1-U traffic related to both the node 111 and one or more (for example, all) the descendant IAB nodes of the node 111 together in response to receiving the start request associated with the node 111. For example, CU-UP 103 may start all DL F1-U traffic for the terminal devices connected to the node 111 and descendant IAB nodes of the node 111.

For example, based on information associated with an IAB node included in the start request from the CU-CP 102, the CU-UP 103 may determine that the start request is associated with the node 111, and may know that the descendant IAB nodes of the node 111 include the node 113 and the node 114. Then, for example, the CU-UP 103 may start or resume together the DL transmissions for the F1-U interfaces between the CU-UP 103 and the node 111 (including the DL F1-U traffic related to the node 113, the DL F1-U traffic related to the node 114, and the F1-U traffic related to the UE 115), the DL transmissions for the F1-U interfaces between the CU-UP 103 and the node 113 (including the DL F1-U traffic related to the UE 116, the DL F1-U traffic related to the UE 117, and the F1-U traffic related to the UE 118), and the DL transmissions for the F1-U interfaces between the CU-UP 103 and the node 114 (including the DL F1-U traffic related to the UE 119 and the DL F1-U traffic related to the UE 120).

For example, the CU-UP 103 may resume the previously stopped DL transmission for the F1-U interfaces between the CU-UP 103 and the node 111, the node 113, and the node 114, respectively, by using the previously buffered DL F1-U data in response to the received start request associated with the node 111 from the CU-CP 102, so that the DL transmissions for the F1-U interfaces between the CU-UP 103 and the node 111, the node 113, and the node 114 may be continued.

FIG. 1 illustrates an example in a case of the intra-donor topology adaptation where changes of connections among IAB nodes are within the IAB network under the same donor 101. FIG. 2 illustrates another example of DL transmission control in an IAB network in an embodiment, which may be a case of the inter-donor topology adaptation.

In the example as illustrated in FIG. 2, another IAB network including a donor 201 and a node 207 is also involved in addition to the IAB network as illustrated in FIG. 1. The donor 101 and the donor 201 may both connected to a core network (CN) 205. At least one DU 204 of the donor 201 may be controlled by the CU of the donor 201 including the CU-CP 202 and the CU-UP 203, and serves the node 207 and a UE 206.

As illustrated in FIG. 2, the connection 121 between the node 107 and the node 111 is now to be disconnected for example in a case where a failure is suffered on the connection 121 or the MT part of the node 111 is now to detach from a cell associated with the node 107, and a new connection between the node 111 and the node 207 is expected, so that the node 111 originally served by the node 107 under the donor 101 is to be served by the node 207 under another donor 201 after an inter-donor topology adaptation.

For the disconnection of the node 111 from the node 107, the CU-CP 102 may transmit, to the CU-UP 103, at least one request to stop the DL transmission(s) for the F1-U interface or GTP tunnel (for example, for all F1-U interfaces associated with the node 111, or GTP tunnels for a F1-U interface associated with the node 111, or some GTP tunnels for a F1-U interface associated with the node 111) between the CU-UP 103 and the node 111, and/or to stop the DL transmission(s) for the F1-U interface(s) or GTP tunnel(s) between the CU-UP 103 and one or more (for example, all) descendant IAB nodes of the node 111. The operations involved in this procedure may be similar to those related to the stop request which have been described above with reference to FIG. 1, and will not be repeated for simplicity and clarity.

For the DL F1-U data of the stopped DL transmissions, for example, at least a part of the DL F1-U data for the DL transmissions for the F1-U interfaces between the CU-UP 103 and the node 111 and/or at least a part of the DL F1-U data for the DL transmissions for the F1-U interfaces between the CU-UP 103 and the descendant IAB nodes of the node 111 may be buffered by the CU-UP 103, or may be transmitted to the donor 201 for example via the CN 205 and then be buffered by the CU-UP 203, for a later resumption of the DL transmissions for the F1-U interfaces between the CU-UP 103 and the node 111 and/or descendant IAB nodes of the node 111.

In a case where the node 111 connects to the node 207 via the new connection 208, the CU-CP 202 may transmit, to the CU-UP 203, a request to start or enable the DL transmission(s) for F1-U interfaces (or the GTP tunnels) between the CU-UP 203 and the node 111, for example including the DL F1-U traffic related to the node 113, the DL F1-U traffic related to the node 114, and the DL F1-U traffic related to the UE 115, which are via the node 208 under the donor 201 rather than the original node 107 under the donor 101.

The start request from the CU-CP 202 to the CU-UP 203 may be similar to the start request from the CU-CP 102 to the CU-UP 103 which has been described above with reference to FIG. 1, and the operations of the CU-UP 203 in response to the start request from the CU-CP 202 may be also similar to the operations of the CU-UP 103 in response to the start request from the CU-CP 102 which have also been described above with reference to FIG. 1.

For example, such start request associated with the node 111 from the CU-CP 202 to the CU-UP 203 may also include information associated with the node 111, including, but not limited to, one or more of: an ID of a DU of the node 111; an address of the node 111, for example, an internet protocol address of the IAB-DU in the node 111, or a Backhaul Adaptation Protocol (BAP) address of the node 111, etc.; an ID of a cell associated with the node 111; a routing ID associated with node 111; a quality of service parameter for F1-U traffic associated with node 111; and so on. In another example, such start request associated with the node 111 from the CU-CP 202 to the CU-UP 203 may include, but is not limited to, one or more of: a list of IDs of at least one DU of the node 111; a list of addresses of the node 111; a list of IDs of at least one cell associated with the node 111; a list of routing IDs associated with node 111; and a list of quality of service parameters for F1-U traffic associated with node 111.

In response to receiving the start request from the CU-CP 202, the CU-UP 203 may start or resume the DL transmission(s) for the F1-U interface(s) associated with the at least one DU ID or IAB node address included in the start request. For example, in a case where the start request from the CU-CP 202 includes at least one cell ID, the CU-UP 203 may determine the F1-U interface(s) associated with at least one cell based on the at least one cell ID included in the start request, and may start or resume the DL transmission(s) for the F1-U interface(s) or GTP tunnel(s) associated with the at least one cell as indicated in the stop request. Thus, for example, the DL transmissions for the F1-U interfaces (or GTP tunnels) between the CU-UP 203 and the node 111 (including the DL F1-U traffic related to the node 113, the DL F1-U traffic related to the node 114, and the DL F1-U traffic related to the UE 115) may be started or resumed together by the CU-UP 203 in response to the start request associated with the node 111 from the CU-CP 202, via the new serving node 207 under the donor 201 rather than the original serving node 107 under the donor 101.

For example, in response to the received start request from the CU-CP 202, the CU-UP 203 may resume the previously stopped DL transmission for the F1-U interfaces (or GTP tunnels) between the CU-UP 203 and the node 111 by using the DL F1-U data previously received from the donor 101 via the CN 205 and buffered at the CU-UP 203, or by using the DL F1-U data buffered at the CU-UP 103 and transmitted to the donor 201 (which is for example directly received from the donor 101, or indirectly received from the donor 101 via the CN 205), so that the DL F1-U transmissions for the F1-U interfaces or at the user plane associated with the node 111 may be continued.

In a case where the CU-UP 203 does not know information associated with the descendant IAB nodes (including the child IAB nodes 113 and 114) of the node 111, for example, the CU-CP 202 may further transmit, to the CU-UP 203, another request to start or resume the DL transmission(s) for the F1-U interface(s) (for example all F1-U interfaces associated with the node 113, or all GTP tunnels for a F1-U interface associated with the node 113, or some GTP tunnels for a F1-U interface associated with the node 113) between the CU-UP 203 and the node 113, and yet another request to start or resume the DL transmission(s) for the F1-U interface(s) (for example all F1-U interfaces associated with the node 114, or all GTP tunnels for a F1-U interface associated with the node 114, or some GTP tunnels for a F1-U interface associated with the node 114) between the CU-UP 203 and the node 114. For example, the start request associated with the node 113 from the CU-CP 202 to the CU-UP 203 may include information associated with the node 113, for example including at least one of an ID of a DU of the node 113, an address of the node 113, for example, an internet protocol address of the IAB-DU in the node 113, or a Backhaul Adaptation Protocol (BAP) address of the node 113, etc., an ID of a cell associated with the node 113, a routing ID associated with node 113, and a quality of service parameter for F1-U traffic associated with node 113. The start request associated with the node 114 from the CU-CP 202 to the CU-UP 203 may include information associated with the node 114, for example including at least one of an ID of a DU of the node 114, an address of the node 114, for example, an internet protocol address of the IAB-DU in the node 114, or a Backhaul Adaptation Protocol (BAP) address of the node 114, etc., an ID of a cell associated with the node 114, a routing ID associated with node 114, a quality of service parameter for F1-U traffic associated with node 114. For example, the start request associated with the node 113 from the CU-CP 202 to the CU-UP 203 may also include a list of IDs of the DUs of the node 113 and/or a list of addresses of the node 113 and/or a list of IDs of the cells associated with the node 113 and/or a list of routing IDs associated with node 113 and/or a list of quality of service parameters for F1-U traffic associated with node 113, and the start request associated with the node 114 from the CU-CP 202 to the CU-UP 203 may also include a list of IDs of the DUs of the node 114 and/or a list of addresses of the node 114 and/or a list of IDs of the cells associated with the node 114 and/or a list of routing IDs associated with node 114 and/or a list of quality of service parameters for F1-U traffic associated with node 114.

In another example, in a case where the CU-UP 203 does not know information associated with the descendant IAB nodes (including the child IAB nodes 113 and 114) of the node 111, the CU-CP 202 may further transmit, to the CU-UP 203, another request to start or resume at least one of: the DL transmission(s) for the F1-U interface(s) (for example all F1-U interfaces associated with the node 113, or all GTP tunnels for a F1-U interface associated with the node 113, or some GTP tunnels for a F1-U interface associated with the node 113) between the CU-UP 203 and the node 113, and the DL transmission(s) for the F1-U interface(s) (for example all F1-U interfaces associated with the node 114, or all GTP tunnels for a F1-U interface associated with the node 114, or some GTP tunnels for a F1-U interface associated with the node 114) between the CU-UP 203 and the node 114. For example, such start request associated with both the node 113 and the node 114 may include both information associated with the node 113 and both information associated with the node 114.

Then, in response to receiving respective start requests from the CU-CP 202, the CU-UP 203 may perform substantially the same operations for respective start requests, so as start or resume the DL transmission(s) for the F1-U interface(s) associated with the at least one DU ID or IAB node address included in the respective start request. For example, in a case where the start request from the CU-CP 202 includes at least one cell ID, the CU-UP 203 may determine the F1-U interface(s) associated with at least one cell based on the at least one cell ID included in the start request, and may start or resume the DL transmission(s) for the F1-U interface(s) or GTP tunnel(s) associated with the at least one cell as indicated in the start request. Thus, for example, the DL transmissions for the F1-U interfaces (or GTP tunnels) between the CU-UP 203 and the node 111 (including the DL F1-U traffic related to the node 113, the DL F1-U traffic related to the node 114, and the DL F1-U traffic related to the UE 115) may be started or resumed together by the CU-UP 203 in response to the start request associated with the node 111 from the CU-CP 202, the DL transmissions for the F1-U interfaces (or GTP tunnels) between the CU-UP 203 and the node 113 (including the DL F1-U traffic related to the UE 116, the DL F1-U traffic related to the UE 117, and the DL F1-U traffic related to the UE 118) may be started or resumed together by the CU-UP 203 in response to the start request associated with the node 113 from the CU-CP 202, and the DL transmissions for the F1-U interfaces (or GTP tunnels) between the CU-UP 203 and the node 114 (including the DL F1-U traffic related to the UE 119 and the DL F1-U traffic related to the UE 120) may be started or resume together by the CU-UP 203 in response to the start request associated with the node 114 from the CU-CP 202.

In another example, in a case where the CU-UP 203 does not know information associated with the descendant IAB nodes (including the child IAB nodes 113 and 114) of the node 111, the start request associated with the node 111 from the CU-CP 202 to the CU-UP 203 may further include information associated with the descendant IAB node(s) of the node 111, for example including, but not limited to, one or more of: an ID of a DU of the node 113; an address of the node 113, for example, an internet protocol address of the IAB-DU in the node 113, or a Backhaul Adaptation Protocol (BAP) address of the node 113, etc.; an ID of a cell associated with the node 113; a routing ID associated with node 113; and a quality of service parameter for F1-U traffic associated with node 113; an ID of a DU of the node 114; an address of the node 114, for example, an internet protocol address of the IAB-DU in the node 114, or a Backhaul Adaptation Protocol (BAP) address of the node 114, etc.; an ID of a cell associated with the node 114; a routing ID associated with node 114; and a quality of service parameter for F1-U traffic associated with node 114. For example, in a case where one or both of the nodes 113 and 114 have more than one addresses, and/or have more than one DUs, and/or are associated with more than one cells, the start request associated with the node 111 from the CU-CP 202 to the CU-UP 203 may also include one or more of: a list of IDs of the DUs of the node 113; a list of addresses of the node 113; a list of IDs of the cells associated with the node 113; a list of routing IDs associated with node 113; a list of quality of service parameters for F1-U traffic associated with node 113; a list of IDs of the DUs of the node 114; a list of addresses of the node 114; a list of IDs of the cells associated with the node 114; a list of routing IDs associated with node 114; a list of quality of service parameters for F1-U traffic associated with node 114; and so on.

Then, in response to receiving the start request from the CU-CP 202, the CU-UP 203 may start or resume the DL transmission(s) for the F1-U interface(s) associated with the respective DU IDs or IAB node addresses included in the start request. For example, in a case where the start request from the CU-CP 202 includes at least one cell ID, the CU-UP 203 may determine the F1-U interface(s) associated with at least one cell based on the at least one cell ID included in the stop request, and may start or resume the DL transmission(s) for the F1-U interface(s) or GTP tunnel(s) associated with the at least one cell as indicated in the start request. Thus, for example, the DL transmissions for the F1-U interfaces (or GTP tunnels) between the CU-UP 203 and the node 111 (including the DL F1-U traffic related to the node 113, the DL F1-U traffic related to the node 114, and the DL F1-U traffic related to the UE 115), the DL transmissions for the F1-U interfaces (or GTP tunnels) between the CU-UP 203 and the node 113 (including the DL F1-U traffic related to UE 116, the DL F1-U traffic related to the UE 117, and the DL F1-U traffic related to the UE 118), and the DL transmissions for the F1-U interfaces (or GTP tunnels) between the CU-UP 203 and the node 114 (including the DL F1-U traffic related to the UE 119 and the DL F1-U traffic related to the UE 120) may be started or resumed together by the CU-UP 203 in response to the start request associated with the node 111 from the CU-CP 202.

In another example, in a case where the CU-UP 203 knows information associated with the descendant IAB nodes (including the child nodes 113 and 114) of the node 111, the CU-UP 203 may start or resume DL F1-U traffic related to both the node 111 and one or more (for example, all) the descendant IAB nodes of the node 111 together in response to receiving the start request associated with the node 111. For example, CU-UP 203 may start all DL F1-U traffic for the terminal devices connected to the node 111 and descendant IAB nodes of the node 111.

For example, based on information associated with an IAB node included in the start request from the CU-CP 202, the CU-UP 203 may determine that the start request is associated with the node 111, and may know that the descendant IAB nodes of the node 111 including the node 113 and the node 114. Then, for example, the CU-UP 203 may start or resume together the DL transmissions for the F1-U interfaces (or GTP tunnels) between the CU-UP 203 and the node 111 (including the DL F1-U traffic related to the node 113, the DL F1-U traffic related to the node 114, and the DL F1-U traffic related to the UE 115), the DL transmissions for the F1-U interfaces (or GTP tunnels) between the CU-UP 203 and the node 113 (including the DL F1-U traffic related to the UE 116, the DL F1-U traffic related to the UE 117, and the DL F1-U traffic related to the UE 118), and the DL transmissions for the F1-U interfaces (or GTP tunnels) between the CU-UP 203 and the node 114 (including the DL F1-U traffic related to the UE 119 and the DL F1-U traffic related to the UE 120).

For example, in response to the received start request from the CU-CP 202, the CU-UP 203 may resume the DL transmission for the F1-U interfaces (or GTP tunnels) between the CU-UP 203 and the node 111 by using the DL F1-U data previously received from the donor 101 via the CN 205 and buffered at the CU-UP 203, or by using the DL F1-U data buffered at the CU-UP 103 and transmitted to the donor 201 (which is for example directly received from donor 101, or indirectly received from donor 101 via the CN 205), so that the DL transmissions for the F1-U interfaces or at the user plane associated with the node 111 may be continued.

FIG. 3 to FIG. 6 illustrate examples of operations of the CU-CP and CU-UP for controlling the DL transmissions in different embodiments, where examples of CU-CP 301 may include the CU-CP 102 or 202 in the above examples as illustrated in FIG. 1 or FIG. 2, and examples of CU-UP 302 may include the CU-UP 103 or 203 in the above examples as illustrated in FIG. 1 or FIG. 2.

Figure 3:
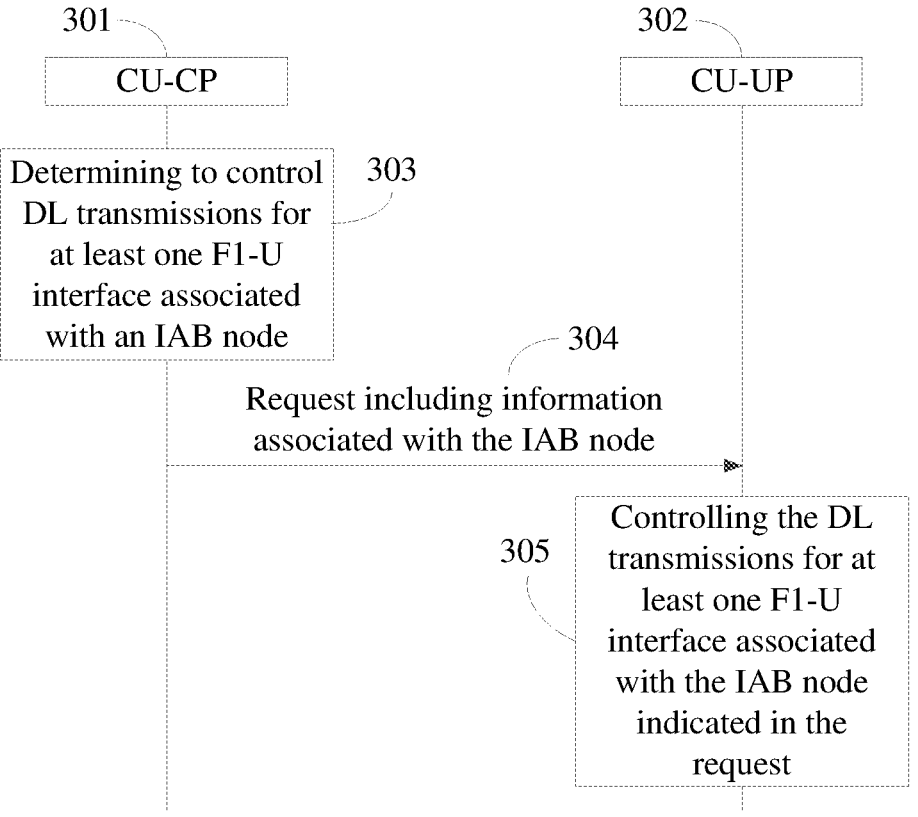
FIG. 3 illustrates an example of operations for controlling the downlink transmissions in an IAB network in an embodiment.

As illustrated in FIG. 3, in an embodiment, the CU-CP 301 may determine to control DL transmission(s) for F1-U interface(s) (for example all F1-U interfaces associated with the IAB node, or all GTP tunnels for a F1-U interface associated with the IAB node, or some GTP tunnels for a F1-U interface associated with the IAB node), which is between the CU-UP and an IAB node and thus may be associated with the IAB node in an operation 303. For example, the DL transmission(s) for the F1-U interface(s) associated with the IAB node may include DL F1-U traffics related to at least one descendant IAB node or UE served by this IAB node. In an embodiment, the controlling may include starting (or enabling or restarting or resuming) the DL transmission(s). In another embodiment, the controlling may also include stopping (or disabling) the DL transmission(s). In various embodiments, any suitable manners or methods may be adopted by the CU-CP 301 to perform the operation 303. For example, the CU-CP 301 may make such determination in the operation 303 in response to receiving a switching message, or in response to a detecting that one or more predetermined conditions are satisfied, for example no traffic for an IAB node for a predetermined period, or radio link failure with the IAB node.

Then, the CU-CP 301 may transmit, to the CU-UP 302, a request 304 to control the DL transmission(s) for F1-U interface(s) between the CU-UP 302 and an IAB node, where the request 304 is not associated to a single specific UE and it is related to the whole F1-U interface(s). Due to the nature that this request is not UE associated, it is also referred as non UE-associated signaling. The non UE-associated signaling request may include information associated with the IAB node determined by the CU-CP 301 in the operation 303, for example including, but not limited to one or more of an ID of a DU of the determined IAB node, an address of the determined IAB node, an ID of a cell associated with the determined IAB node, a routing ID associated with the determined IAB node; a quality of service parameter for traffic associated with the determined IAB node; and so on. Depending on the determination in the operation 303, in an embodiment, the request 304 may be a start request to start or resume the DL transmission(s) for the F1-U interface(s) between the CU-UP 302 and the determined IAB node, for example in a case of an attachment or reconnection of the IAB node to the IAB network. In another embodiment, the request 304 may be a stop request to stop the DL transmission(s) for the F1-U interface(s) between the CU-UP 302 and the determined IAB node, for example in a case of a detachment or disconnection of the IAB node from the IAB network.

Then, in response to receiving the request 304, the CU-UP 302 may control the DL transmission(s) for F1-U interface(s) between the CU-UP 302 and the IAB node, for example associated with at least one of: respective DU ID(s) of respective DU(s) in the IAB node indicated in the request 304, and/or the at least one address of the IAB node indicated in the request 304, and/or the at least cell ID indicated in the request 304, and/or the at least routing ID, and/or at least one quality of service parameter indicated in the request 304, in an operation 305. For example, in the operation 305, if the request 304 is a stop request, the CU-UP 302 may stop the DL transmission(s) for the F1-U interface(s) between the CU-UP 302 and the IAB node as indicated in the request 304, thus stop the DL transmission for all F1-U GTP tunnels terminated at the DU of the IAB node. In another example, the CU-UP 302 may stop the DL transmission(s) for all F1-U GTP tunnels corresponding to the address as indicated in the request 304. In yet another example, the CU-UP 302 may stop the DL transmission(s) for all F1-U GTP tunnels corresponding to the cell identity as indicated in the request 304. For example, for all UEs served by the cell as indicated in the request 304, the CU-UP 302 may stop the DL transmissions for all F1-U GTP tunnels associated with those UEs. In yet another example, the CU-UP 302 may stop the DL transmission(s) for all F1-U GTP tunnels corresponding to a routing path as indicated in the request 304. For example, the traffic of these F1-U GTP tunnels are sent to the IAB node via the routing path as indicated by the routing ID in the request 304. If the request 304 is a start request, the CU-UP 302 may start the DL transmission(s) for the F1-U interface(s) between the CU-UP 302 and the IAB node as indicated in the request 304, thus start the DL transmission for all F1-U GTP tunnels terminated at the DU of the IAB node. In another example, the CU-UP 302 may start the DL transmission(s) for all F1-U GTP tunnels corresponding to the address as indicated in the request 304. In yet another example, the CU-UP 302 may start the DL transmission(s) for all F1-U GTP tunnels corresponding to the cell identity as indicated in the request 304. For example, for all UEs served by the cell as indicated in the request 304, the CU-UP 302 may start the DL transmissions for all F1-U GTP tunnels associated with those UEs. In yet another example, the CU-UP 302 may start the DL transmission(s) for all F1-U GTP tunnels corresponding to a routing path as indicated in the request 304. The traffic of these F1-U GTP tunnels is sent to the IAB node via the routing path as indicated by the routing ID in the request 304. For example, the CU-UP 302 previously stopped the DL transmission for a dual connected IAB node that declared problem for the connection with one parent node. After the connection is recovered, the CU-CP 310 may request CU-UP 302 to start the DL transmission for all GTP tunnels using the routing ID(s), which correspond to the routing path using that parent node. The CU-UP 302 may start the DL transmission(s) for all F1-U GTP tunnels using the routing ID(s), which correspond to the routing path using that parent node.

Figure 4:
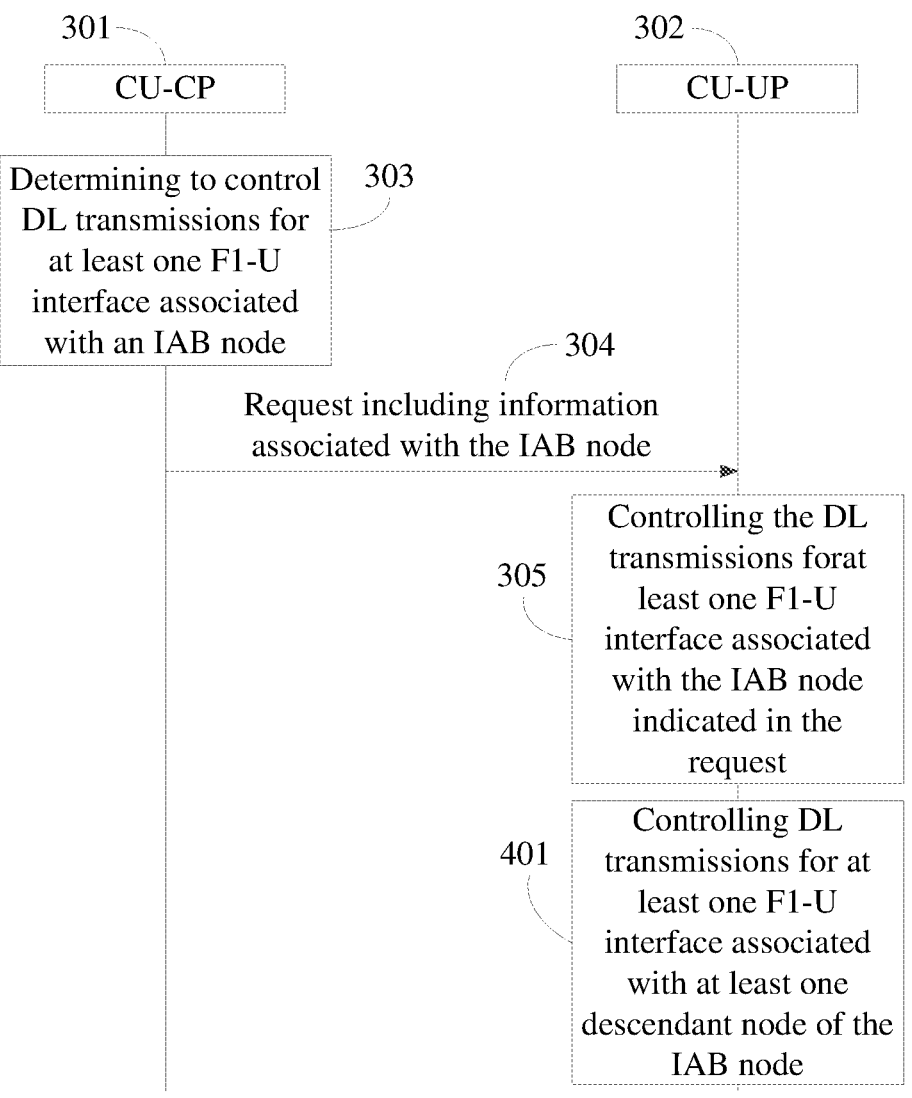
FIG. 4 illustrates an example of operations for controlling the downlink transmissions in an IAB network in an embodiment.

In another embodiment, in a case where the CU-UP 302 knows information associated with the descendant node(s) of the IAB node as indicated in the request 304, for example as illustrated in FIG. 4, the CU-UP 302 may further control the DL transmission(s) for the F1-U interface(s) between the CU-UP 302 and the descendant node(s) of the IAB node in an operation 401. For example, if the request 304 is a start request, the CU-UP 302 may further start or resume the DL transmission(s) for the F1-U interface(s) between the CU-UP 302 and the descendant node(s) of the IAB node in the operation 401. If the request 304 is a stop request, the CU-UP 302 may further stop the DL transmission(s) for the F1-U interface(s) between the CU-UP 302 and the descendant node(s) of the IAB node in the operation 401.

In another embodiment, in a case where the CU-UP 302 does not know information associated with the descendant node(s) of an IAB node, as illustrated in FIG. 5, a request 501 may be transmitted from the CU-CP 301 to the CU-UP 302, instead of the request 304. For example, the request 501 may include information associated with both the IAB node determined in the operation 303 and the descendant node(s) of the IAB node. For example, the request 501 may include the information in the request 304. Further, for a descendant node of the IAB node, the request 501 may further include one or more of a DU ID of the descendant node, an address of the descendant node, a cell ID associated with the descendant node, a routing ID associated with the descendant node, and a quality of service parameter for traffic associated with the descendant node. Thus, the CU-UP 302 may also be enabled to perform an operation 502 to control the DL transmission(s) for the F1-U interface(s) between the CU-UP 302 and the descendant node(s) of the IAB node, when it does not have information associated with the descendant node(s) of the IAB node as indicated in the request 501. For example, if the request 501 is a start request, the CU-UP 302 may further start or resume the DL transmission(s) for the F1-U interface(s) between the CU-UP 302 and the descendant node(s) of the IAB node in the operation 502. If the request 501 is a stop request, the CU-UP 302 may further stop the DL transmission(s) for the F1-U interface(s) between the CU-UP 302 and the descendant node(s) of the IAB node in the operation 502.

Figure 6:
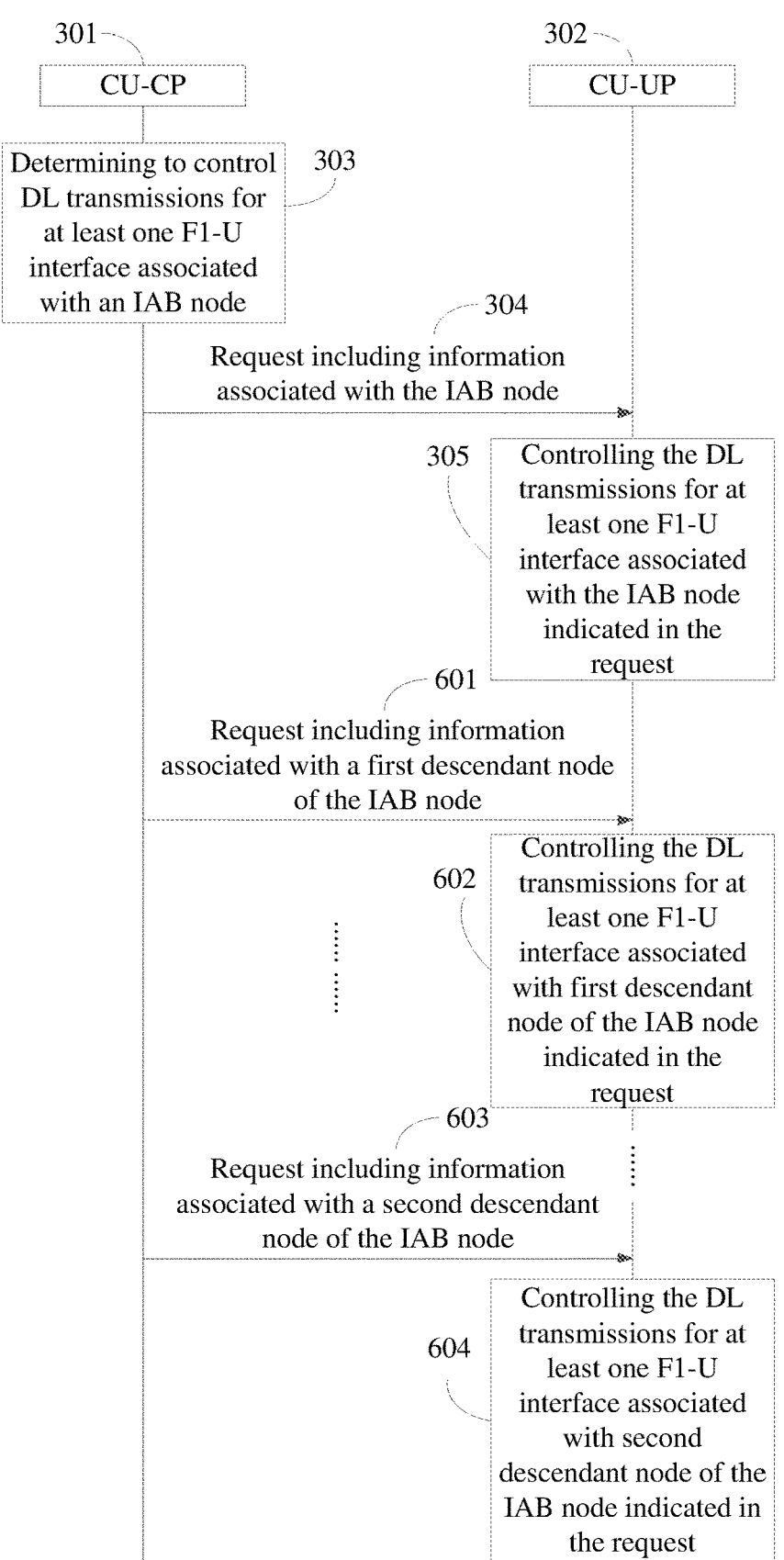
FIG. 6 illustrates an example of operations for controlling the downlink transmissions in an IAB network in an embodiment.

In another embodiment, in a case where the CU-UP 302 does not know information associated with the descendant node(s) of the IAB node, for example as illustrated in FIG. 6, in addition to the operations as illustrated in FIG. 3, for a first descendant node of the IAB node determined in the operation 303 and indicated in the request 304, the CU-CP 301 may further transmit another request 601 to control DL transmission(s) for F1-U interface(s) or GTP tunnel(s) between the CU-UP 302 and the first descendant node. If the request 304 is a start request, the request 601 may be also a start request. If the request 304 is a stop request, the request 601 may be also a stop request. In various embodiments, the request 601 may include, but is not limited to, one or more of: a DU ID of the first descendant node; an address of the first descendant node; a cell ID associated with the first descendant node; a routing ID associated with the first descendant node; a quality of service parameter for traffic associated with the first descendant node; and so on.

Then, in response to receiving the request 601, the CU-UP 302 may control the DL transmission(s) for F1-U interface(s) between the CU-UP 302 and the first descendant node, for example associated with the DU ID of the first descendant node indicated in the request 601, and/or the address of the first descendant node indicated in the request 601, and/or the cell ID indicated in the request 601, in an operation 602. For example, in the operation 602, if the request 601 is a stop request, the CU-UP 302 may stop the DL transmission(s) for the F1-U interface(s) between the CU-UP 302 and the first descendant node as indicated in the request 601, thus stop the DL transmission for all F1-U GTP tunnels terminated at the DU of the first descendant node. In another example, the CU-UP 302 may stop the DL transmission(s) for all F1-U GTP tunnels corresponding to the address as indicated in the request 601. In yet another example, the CU-UP 302 may stop the DL transmission(s) for all F1-U GTP tunnels corresponding to the cell identity as indicated in the request 601. For example, for all UEs served by the cell as indicated in the request 601, the CU-UP 302 may stop the DL transmissions for all F1-U GTP tunnels associated with those UEs. In yet another example, the CU-UP 302 may stop the DL transmission(s) for all F1-U GTP tunnels corresponding to a routing path as indicated in the request 601. For example, the traffic of these F1-U GTP tunnels is sent to the IAB node via the routing path as indicated by the routing ID in the request 601. If the request 601 is a start request, the CU-UP 302 may start the DL transmission(s) for the F1-U interface(s) between the CU-UP 302 and the first descendant node as indicated in the request 601, thus start the DL transmission for all F1-U GTP tunnels terminated at the DU of the first descendant node. In another example, the CU-UP 302 may start the DL transmission(s) for all F1-U GTP tunnels corresponding to the address as indicated in the request 601. In yet another example, the CU-UP 302 may start the DL transmission(s) for all F1-U GTP tunnels corresponding to the cell identity as indicated in the request 601. For example, for all UEs served by the cell as indicated in the request 601, the CU-UP 302 may start the DL transmissions for all F1-U GTP tunnels associated with those UEs. In yet another example, the CU-UP 302 may start the DL transmission(s) for all F1-U GTP tunnels corresponding to a routing path as indicated in the request 601. The traffic of these F1-U GTP tunnels is sent to the IAB node via the routing path as indicated by the routing ID in the request 601. For example, the CU-UP 302 previously stopped the DL transmission for a dual connected IAB node that declared problem for the connection with one parent node. After the connection is recovered, the CU-CP 310 may request CU-UP 302 to start the DL transmission for all GTP tunnels using the routing ID(s), which correspond to the routing path using that parent node. The CU-UP 302 may start the DL transmission(s) for all F1-U GTP tunnels using the routing ID(s), which correspond to the routing path using that parent node.

Further, for a second descendant node of the IAB node determined in the operation 303, the CU-CP 301 may further transmit another request 603 to control DL transmission(s) for F1-U interface(s) or GTP tunnel(s) between the CU-UP 302 and the second descendant node. If the request 304 is a start request, the request 603 may be also a start request. If the request 304 is a stop request, the request 603 may be also a stop request. In various embodiments, the request 603 may include, but is not limited to, one or more of: a DU ID of the second descendant node; an address of the second descendant node; a cell ID associated with the second descendant node; a routing ID associated with the second descendant node; a quality of service parameter for traffic associated with the second descendant node; and so on.

Then, in response to receiving the request 603, the CU-UP 302 may control the DL transmission(s) for F1-U interface(s) between the F1-U interface(s) or GTP tunnel(s) between the CU-UP 302 and the second descendant node, which is for example associated with the DU ID of the second descendant node indicated in the request 603, and/or the address of the second descendant node indicated in the request 603, and/or the cell ID indicated in the request 603, in an operation 604. For example, in the operation 604, if the request 603 is a stop request, the CU-UP 302 may stop the DL transmission(s) for the F1-U interface(s) between the CU-UP 302 and the second descendant node as indicated in the request 603, thus stop the DL transmission for all F1-U GTP tunnels terminated at the DU of the second descendant node. In another example, the CU-UP 302 may stop the DL transmission(s) for all F1-U GTP tunnels corresponding to the address as indicated in the request 603. In yet another example, the CU-UP 302 may stop the DL transmission(s) for all F1-U GTP tunnels corresponding to the cell identity as indicated in the request 603. For example, for all UEs served by the cell as indicated in the request 603, the CU-UP 302 may stop the DL transmissions for all F1-U GTP tunnels associated with those UEs. In yet another example, the CU-UP 302 may stop the DL transmission(s) for all F1-U GTP tunnels corresponding to a routing path as indicated in the request 603. For example, the traffic of these F1-U GTP tunnels is sent to the IAB node via the routing path as indicated by the routing ID in the request 603. If the request 603 is a start request, the CU-UP 302 may start the DL transmission(s) for the F1-U interface(s) between the CU-UP 302 and the second descendant node as indicated in the request 603, thus start the DL transmission for all F1-U GTP tunnels terminated at the DU of the second descendant node. In another example, the CU-UP 302 may start the DL transmission(s) for all F1-U GTP tunnels corresponding to the address as indicated in the request 603. In yet another example, the CU-UP 302 may start the DL transmission(s) for all F1-U GTP tunnels corresponding to the cell identity as indicated in the request 603. For example, for all UEs served by the cell as indicated in the request 603, the CU-UP 302 may start the DL transmissions for all F1-U GTP tunnels associated with those UEs. In yet another example, the CU-UP 302 may start the DL transmission(s) for all F1-U GTP tunnels corresponding to a routing path as indicated in the request 603. The traffic of these F1-U GTP tunnels is sent to the IAB node via the routing path as indicated by the routing ID in the request 603. For example, the CU-UP 302 previously stopped the DL transmission for a dual connected IAB node that declared problem for the connection with one parent node. After the connection is recovered, the CU-CP 310 may request CU-UP 302 to start the DL transmission for all GTP tunnels using the routing ID(s), which correspond to the routing path using that parent node. The CU-UP 302 may start the DL transmission(s) for all F1-U GTP tunnels using the routing ID(s), which correspond to the routing path using that parent node.

It is appreciated that this disclosure is not limited to the above examples. For example, a different signaling sequence for respective requests may be adopted based on the example as illustrated in FIG. 6, and a different operation order may also be adopted in the above examples. In another example, the request 304 or 501 or 601 or 603 may include information associated with another one or more IAB nodes in the IAB network, which are not limited to the descendant nodes of the determined IAB node (for example the node 111), so that the control may be allowed for DL transmission(s) associated with any one or more specified or expected IAB nodes. In another example, any two or more of the requests 304, 601, and 603 may be combined into one request. Further, it is appreciated that a wording in a singular form may also have a meaning in the plural form. For example, "an address of an IAB node" may also include an example of "at least one address of an IAB node" or "one or more addresses of an IAB node" or "a list of addresses of an IAB node", or the like.

FIG. 7 illustrates an example method 700 for controlling DL transmissions in an IAB network, which may be performed for example in an apparatus associated with CU-CP (for example the CU-CP 102 or 202 or 301 in the above examples) of a donor (for example the donor 101 or 201 in the above examples) in an IAB network.

As illustrated in FIG. 7, the example method 700 may include an operation 701 of determining to control a first DL transmission for a first interface (for example an F1-U interface) between another apparatus associated with CU-UP (for example the CU-UP 103 or 203 or 302 in the above examples) of the donor in the IAB network and a node in the IAB network (for example the node 111 in the examples as illustrated in FIG. 1 and FIG. 2) in the IAB network. An example of the operation 701 may include the operation 303 as illustrated in FIG. 3 to FIG. 6.

Further, the example method 700 may also include an operation 702 of transmitting, to the another apparatus associated with CU-UP (for example the CU-UP 103 or 203 or 302 in the above examples) of the donor in the IAB network, a first non UE-associated signaling request (for example, the request 304 or 501 in the above examples) to control the first DL transmission for the first interface (for example the F1-U interface) between the another apparatus and the node. The first non UE-associated signaling request may include information associated with the node, which may include, but are not limited to, one or more of a DU ID of the node, an address of the node, a cell ID associated with the node, a routing ID associated with the node; a quality of service parameter value for traffic associated with the node; and so on.

Depending on the determination made in the operation 701, the first non UE-associated signaling request may be a request to start the first DL transmission between the another apparatus and the node, or may be a request to start the first DL transmission between the another apparatus and the node.

Thus, a batch control for DL transmission(s) for at least one (for example, all) F1-U interface or GTP tunnel between the CU-UP and the determined IAB node (for example, including DL F1-U traffics for the UE(s) and descendant IAB node(s) served by the determined IAB node) may be allowed with a reduced signaling load, through which for example potential packet loss and resource waste may be avoided or mitigated.

In some embodiments, the first non UE-associated signaling request may further include information associated with another node in the IAB network, for example information associated with a descendant node of the node in the IAB network (for example one or more of the node 113 and the node 114, which are child nodes of the node 111), and an example of first non UE-associated signaling request in these embodiment may include the request 501 in the above examples. For example, for another node in the IAB network which may be or may be not a descendant of the node, the first non UE-associated signaling request may further include one or more of: a DU ID of the another node; an address of the another node; a cell ID associated with the another node; a routing ID associated with the another node; a quality of service parameter value for traffic associated with the another node; and so on. Thus, DL transmission(s) for F1-U interfaces between CU-UP and a plurality nodes in the IAB network, for example associated with both the node and at least one descendant node of the node, may be also controlled even in a case where the another apparatus associated with the CU-UP does not know the information associated with the descendant node(s) of the node or the topology of the IAB network.

In some embodiments, the example method 700 may further include an operation of transmitting a second non UE-associated signaling request (for example the request 601 and the request 603 in the above examples) to the another apparatus associated with the CU-UP. In some embodiment, the second non UE-associated signaling request may be a request to start a second DL transmission for a second interface (for example F1-U interface) between the another apparatus and the descendant node of the node. In some embodiment, the second non UE-associated signaling request may be a request to stop the second DL transmission for the second interface. For example, the second non UE-associated signaling request may include information associated with the descendant node. For example, the second non UE-associated signaling request may include one or more of: a DU ID of the descendant node; an address of the descendant node; a cell ID associated with the descendant node; a routing ID associated with the descendant node; a quality of service parameter value for traffic associated with the descendant node; and so on. Thus, DL transmission(s) for the F1-U interfaces or GTP tunnels between CU-UP and the descendant node of the node may be also controlled even in a case where the another apparatus associated with the CU-UP does not know the information associated with the descendant node(s) of the node.

FIG. 8 illustrates an example apparatus 800 for controlling DL transmissions in an IAB network, which may be at least a part of an apparatus associated with CU-CP (for example the CU-CP 102 or 202 or 301 in the above examples) of a donor (for example the donor 101 or 201 in the above examples) in an IAB network.

As shown in FIG. 8, the example apparatus 800 may include at least one processor 801 and at least one memory 802 that may include computer program code 803. The at least one memory 802 and the computer program code 803 may be configured to, with the at least one processor 801, cause the apparatus 800 at least to perform at least the operations of the example method 700 described above.

In various embodiments, the at least one processor 801 in the example apparatus 800 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 801 may also include at least one other circuitry or element not shown in FIG. 8.

In various embodiments, the at least one memory 802 in the example apparatus 800 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 802 may include, but are not limited to, an electric, a magnetic, an optical, an electromagnetic, an infrared, or a semiconductor system, apparatus, or device or any combination of the above.

Further, in various embodiments, the example apparatus 800 may also include at least one other circuitry, element, and interface, for example at least one I/O interface, at least one antenna element, and the like.

In various embodiments, the circuitries, parts, elements, and interfaces in the example apparatus 800, including the at least one processor 801 and the at least one memory 802, may be coupled together via any suitable connections including, but not limited to, buses, crossbars, wiring and/or wireless lines, in any suitable ways, for example electrically, magnetically, optically, electromagnetically, and the like.

FIG. 9 illustrates another example apparatus 900 for controlling DL transmissions in an IAB network, which may be at least a part of an apparatus associated with CU-CP (for example the CU-CP 102 or 202 or 301 in the above examples) of a donor (for example the donor 101 or 201 in the above examples) in an IAB network.

As illustrated in FIG. 9, the example apparatus 900 may include means 901 for performing the operation 701 of the example method 700 and means 902 for performing the operation 702 of the example method 700. In one or more another embodiment, at least one I/O interface, at least one antenna element, and the like may also be included in the example apparatus 900. In some embodiments, examples of means in the apparatus 900 may include circuitries. In some embodiments, examples of means may also include software modules and any other suitable function entities. In some embodiments, one or more additional means may be included in the apparatus 900 for performing one or more additional operations of the example method 900.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

FIG. 10 illustrates an example method 1000 for controlling DL transmissions in an IAB network, which may be performed for example in an apparatus associated with CU-UP (for example the CU-UP 103 or 203 or 302 in the above examples) of a donor (for example the donor 101 or 201 in the above examples) in an IAB network, to cooperate with the example method 700.

As illustrated in FIG. 10, the example method 1000 may include an operation 1001 of receiving, from another apparatus associated with the CU-CP (for example the CU-CP 102 or 202 or 301 in the above examples) of the donor in the IAB network, a request (for example, the request 304 or 501 or 601 or 603 in the above examples) to control a first DL transmission for a first interface (for example, F1-U interface) between the apparatus and a node (for example the node 111 in the above examples) in the IAB network. For example, the request may include information associated with the node, for example including, but not limited to, one or more of: a DU ID of the node; an address of the node; a cell ID associated with the node; a routing ID associated with the node; a quality of service parameter value for traffic associated with the node; and so on.

Further, the example method 1000 may further include an operation 1002 of controlling the first DL transmission for the first interface based on the request received in the operation 1001. Depending on the request received in the operation 1001, the controlling in the operation 1002 may include stopping the first DL transmission for the first interface in a case where the request indicates to stop the first DL transmission for the first interface, or starting the first DL transmission for the first interface in a case where the request indicates to start the first DL transmission for the first interface.

Thus, a batch control for DL transmission(s) for F1-U interfaces or GTP tunnels (for example, all F1-U interfaces associated with the IAB node, or all GTP tunnels for a F1-U interface associated with the IAB node, or some GTP tunnels for a F1-U interface associated with the IAB node) between CU-UP and the determined IAB node (including DL F1-U traffics for UE(s) and descendant IAB node(s) served by the determined IAB node) may be allowed with a reduced signaling load, through which for example potential packet loss and resource waste may be avoided or mitigated.

In some embodiments, the request may further include information associated with another node in the IAB network, for example a descendant node of the node in the IAB network (for example one or more of the node 113 and the node 114, which are descendant nodes of the node 111), and an example of request in these embodiment may include the request 501 in the above examples. For example, the request may further include one or more of: a DU ID of another node; an address of another node; a cell ID associated with another node; a routing ID associated with another node; a quality of service parameter value for traffic associated with the another node; and so on. Thus, DL transmission(s) or F1-U interfaces between CU-UP and a plurality of nodes in the IAB network, for example both the node and at least one descendant node of the node, may be controlled together even in a case where the another apparatus associated with the CU-UP does not know the information associated with the descendant node(s) of the node or the topology of the IAB network.

In some embodiments, for example in a case where the apparatus associated with the CU-UP knows the information associated with the descendant node(s) of the node, for example from the request or according to any other suitable configurations, the example method 1000 may further include an operation of stopping a second DL transmission for a second interface between the apparatus and a descendant node of the node for example in a case where the request indicates to stop the first DL transmission for the first interface, or an operation of starting the second DL transmission for the second interface for example in a case where the request indicates to start the first DL transmission for the first interface. Thus, DL transmission(s) associated with for example both the node and the descendant node of the node may be controlled together.

FIG. 11 illustrates an example apparatus 1100 for controlling DL transmissions in an IAB network, which may be at least a part of an apparatus associated with CU-UP (for example the CU-UP 103 or 203 or 302 in the above examples) of a donor (for example the donor 101 or 201 in the above examples) in an IAB network.

As shown in FIG. 11, the example apparatus 1100 may include at least one processor 1101 and at least one memory 1102 that may include computer program code 1103. The at least one memory 1102 and the computer program code 1103 may be configured to, with the at least one processor 1101, cause the apparatus 1100 at least to perform at least the operations of the example method 1000 described above.

In various embodiments, the at least one processor 1101 in the example apparatus 1100 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1101 may also include at least one other circuitry or element not shown in FIG. 11.

In various embodiments, the at least one memory 1102 in the example apparatus 1100 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1102 may include, but are not limited to, an electric, a magnetic, an optical, an electromagnetic, an infrared, or a semiconductor system, apparatus, or device or any combination of the above.

Further, in various embodiments, the example apparatus 1100 may also include at least one other circuitry, element, and interface, for example at least one I/O interface, at least one antenna element, and the like.

In various embodiments, the circuitries, parts, elements, and interfaces in the example apparatus 1100, including the at least one processor 1101 and the at least one memory 1102, may be coupled together via any suitable connections including, but not limited to, buses, crossbars, wiring and/or wireless lines, in any suitable ways, for example electrically, magnetically, optically, electromagnetically, and the like.

FIG. 12 illustrates another example apparatus 1200 for controlling DL transmissions in an IAB network, which may be at least a part of an apparatus associated with CU-UP (for example the CU-UP 103 or 203 or 302 in the above examples) of a donor (for example the donor 101 or 201 in the above examples) in an IAB network.

As illustrated in FIG. 12, the example apparatus 1200 may include means 1201 for performing the operation 1001 of the example method 1000 and means 1202 for performing the operation 1002 of the example method 1000. In one or more another embodiment, at least one I/O interface, at least one antenna element, and the like may also be included in the example apparatus 1200. In some embodiments, examples of means in the apparatus 1200 may include circuitries. In some embodiments, examples of means may also include software modules and any other suitable function entities. In some embodiments, one or more additional means may be included in the apparatus 1200 for performing one or more additional operations of the example method 1200.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

It is appreciated that this disclosure is not limited to the above examples or embodiments. For example, in another embodiment, the request and response use non-UE associated signaling, the interface between CU-CP 102/202/301 and CU-UP 103/203/302 may be an E1 interface and the request and response between them may be E1 Application Protocol (E1AP) messages.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list. Further, it is appreciated that the modifiers such as "first" and "second" throughout the description are used to distinguish different elements, parts, apparatuses, operations, and so on, rather than intending to refer to some specific elements, parts, apparatuses, operations, and so on, or emphasizing order, importance, priority of respective elements, parts, apparatuses, operations, and so on. For example, a "first apparatus" in an embodiment may be a "second apparatus" in another embodiment.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts some of the embodiments described above can be combined to provide further embodiments. The accompanying claims and their equivalents are intended to cover such forms or modifications as would fall within the scope and spirit of the disclosure.

What is claimed is:

1. An apparatus, comprising:
at least one processor; and
at least one memory storing computer program code, the at least one memory and the computer program code being configured to, with the at least one processor, cause the apparatus as a first apparatus associated with a control plane of a central unit of a donor in an integrated access and backhaul network to perform:
determining to stop a first downlink transmission of F1-U General Packet Radio Service Tunneling Protocol (GTP) tunnels for all traffic associated with a distributed unit (DU) of a node for a first interface between a second apparatus associated with a user plane of the central unit of the donor and a node—in the integrated access and backhaul network, wherein the determining is performed in response to: receiving a switching message, detecting an absence of traffic for the node for a determined period, or detecting a radio link failure associated with the node;
transmitting, to the second apparatus, a first non UE-associated signaling request to stop the first downlink transmission for an F1-U interface, wherein the first non UE-associated signaling request comprises information associated with the node, the information comprising: a distributed unit identifier (DU ID), an Internet Protocol (IP) address, a Backhaul Adaptation Protocol (BAP) address, a cell identifier, a routing identifier, and a quality of service parameter; and
transmitting, to the second apparatus, a second non UE-associated signaling request to stop a second downlink transmission for a F1-U interface associated with a descendant node of the node, wherein the second non UE-associated signaling request comprises information associated with the descendant node, the information comprising: a DU ID, an IP address, a BAP address, a cell identifier, a routing identifier, and a quality of service parameter.

2. The apparatus of claim 1,
wherein the first non UE-associated signaling request comprises a list of routing identifiers (IDs) corresponding to multiple routing paths of the node, and the second apparatus stops the DL transmissions for all F1-U GTP tunnels routed through the listed routing paths;
wherein the second non UE-associated signaling request further comprises a quality of service (QOS) parameter value associated with the node; and
wherein only the DL transmissions for F1-U GTP tunnels that cannot satisfy the QoS parameter value are stopped.

3. The apparatus of claim 2, wherein the first non UE-associated signaling request further comprises at least one of:
an identity of a distributed unit of a descendant node of the node in the integrated access and backhaul network;
an address of the descendant node;
an identifier of a cell associated with the descendant node;
a routing identifier of a routing path associated with the descendant node; and
a quality of service parameter for traffic associated with the descendant node.

4. The apparatus of claim 2, wherein the second non UE-associated signaling request further comprises:
an identity of a distributed unit of the descendant node;
an address of the descendant node;
an identifier of a cell associated with the descendant node;
a routing identifier of a routing path associated with the descendant node; and
a quality of service parameter for traffic associated with the descendant node.

5. An apparatus, comprising:
at least one processor; and
at least one memory storing computer program code, the at least one memory and the computer program code being configured to, with the at least one processor, cause the apparatus as a first apparatus associated with a user plane of a central unit of a donor in an integrated access and backhaul network to perform:
receiving, from a second apparatus associated with a control plane of the central unit of the donor, a first non UE-associated signaling request to stop a first downlink transmission for a first interface between the first apparatus and a node in the integrated access and backhaul network, wherein the first non UE-associated signaling request comprising-information associated with the node, the information comprising: a distributed unit identifier (DU ID), an Internet Protocol (IP) address, a Backhaul Adaptation Protocol (BAP) address, a cell identifier, a routing identifier, and a quality of service parameter; and
receiving, from the second apparatus, a second non UE-associated signaling request to stop a second downlink transmission for a F1-U interface associated with a descendant node of the node, wherein the second non UE-associated signaling request comprises information associated with the descendant node, the information comprising: a DU ID, an IP address, a BAP address, a cell identifier, a routing identifier, and a quality of service parameter; and controlling the first downlink transmission for the first interface based on the first and second non UE-associated signaling request.

6. The apparatus of claim 5, wherein the first non UE-associated signaling request further comprises:

an identity of a distributed unit of the node;

an address of the node;

an identifier of a cell associated with the node;

a routing identifier of a routing path associated with the node; and a quality of service parameter for traffic associated with the node.

7. The apparatus of claim 6, wherein the first non UE-associated signaling request further comprises:

an identity of a distributed unit of the descendant node of the node in the integrated access and backhaul network;

an address of the descendant node;

an identifier of a cell associated with the descendant node;

a routing identifier of a routing path associated with the descendant node; and a quality of service parameter for traffic associated with the descendant node.

8. A method, comprising:

determining, at a first apparatus associated with a control plane of a central unit of a donor in an integrated access and backhaul network, to stop a first downlink transmission of F1-U General Packet Radio Service Tunneling Protocol (GTP) tunnels for all traffic associated with a distributed unit (DU) of a node for a first interface between a second apparatus associated with a user plane of the central unit of the donor and a node in the integrated access and backhaul network, wherein the determining is performed in response to receiving a switching message, detecting an absence of traffic for the node for a determined period, and detecting a radio link failure associated with the node;

transmitting, to the second apparatus, a first non UE-associated signaling request to stop the first downlink transmission for an F1-U interface wherein the first non UE-associated signaling request comprises information associated with the node, the information comprising: a distributed unit identifier (DU ID), an Internet Protocol (IP) address, a Backhaul Adaptation Protocol (BAP) address, a cell identifier, a routing identifier, and a quality of service parameter; and transmitting, to the second apparatus, a second non UE-associated signaling request to stop stop a second downlink transmission for a F1-U interface associated with a descendant node of the node, wherein the second non UE-associated signaling request comprises information associated with the descendant node, the information comprising: a DU ID, an IP address, a BAP address, a cell identifier, a routing identifier, and a quality of service parameter.

9. The method of claim 8, wherein the first non UE-associated signaling request further comprises:

a request to start the first downlink transmission for the first interface; or a request to stop the first downlink transmission for the first interface.

10. The method of claim 9, wherein the first non UE-associated signaling request further comprises at least one of:

an identity of a distributed unit of the node;

an address of the node;

an identifier of a cell associated with the node;

a routing identifier of a routing path associated with the node; and a quality of service parameter for traffic associated with the node.

11. The method of claim 10, wherein the first non UE-associated signaling request further comprises at least one of:

an identity of a distributed unit of a descendant node of the node in the integrated access and backhaul network;

an address of the descendant node;

an identifier of a cell associated with the descendant node;

a routing identifier of a routing path associated with the descendant node; and a quality of service parameter for traffic associated with the descendant node.

12. The method of claim 10, wherein the second non UE-associated signaling request further comprises at least one of:

an identity of a distributed unit of the descendant node;

an address of the descendant node;

an identifier of a cell associated with the descendant node;

a routing identifier of a routing path associated with the descendant node; and a quality of service parameter for traffic associated with the descendant node.

* * * * *